United States Patent
Jen-La Plante et al.

(10) Patent No.: US 11,021,651 B2
(45) Date of Patent: Jun. 1, 2021

(54) THIOLATED HYDROPHILIC LIGANDS FOR IMPROVED QUANTUM DOT RELIABILITY IN RESIN FILMS

(71) Applicant: Nanosys, Inc., Milpitas, CA (US)

(72) Inventors: Ilan Jen-La Plante, San Jose, CA (US); Chunming Wang, Milpitas, CA (US)

(73) Assignee: Nanosys, Inc., Milpitas, CA (US)

( * ) Notice: Subject to any disclaimer, the term of this patent is extended or adjusted under 35 U.S.C. 154(b) by 366 days.

(21) Appl. No.: 16/002,315

(22) Filed: Jun. 7, 2018

(65) Prior Publication Data

US 2018/0354244 A1 Dec. 13, 2018

Related U.S. Application Data

(60) Provisional application No. 62/516,418, filed on Jun. 7, 2017.

(51) Int. Cl.
| | |
|---|---|
| *C09K 11/02* | (2006.01) |
| *C08L 81/04* | (2006.01) |
| *C08L 71/08* | (2006.01) |
| *B82Y 40/00* | (2011.01) |
| *B82Y 30/00* | (2011.01) |

(52) U.S. Cl.
CPC .............. *C09K 11/02* (2013.01); *C08L 71/08* (2013.01); *C08L 81/04* (2013.01); *B82Y 30/00* (2013.01); *B82Y 40/00* (2013.01); *C08L 2203/16* (2013.01); *C08L 2203/20* (2013.01); *Y10S 977/773* (2013.01); *Y10S 977/774* (2013.01); *Y10S 977/815* (2013.01); *Y10S 977/818* (2013.01); *Y10S 977/819* (2013.01); *Y10S 977/821* (2013.01); *Y10S 977/824* (2013.01)

(58) Field of Classification Search
CPC ......... C09K 11/02; B82Y 30/00; B82Y 40/00; Y10S 977/774; Y10S 977/773; Y10S 977/824; Y10S 977/815; Y10S 977/818; Y10S 977/819; Y10S 977/821
See application file for complete search history.

(56) References Cited

U.S. PATENT DOCUMENTS

| | | | |
|---|---|---|---|
| 5,505,928 A | 4/1996 | Alivisatos et al. | |
| 6,207,229 B1 | 3/2001 | Bawendi et al. | |
| 6,225,198 B1 | 5/2001 | Alivisatos et al. | |
| 6,306,736 B1 | 10/2001 | Alivisatos et al. | |
| 6,322,901 B1 | 11/2001 | Bawendi et al. | |
| 6,426,513 B1 | 7/2002 | Bawendi et al. | |
| 6,576,291 B2 | 6/2003 | Bawendi et al. | |
| 6,607,829 B1 | 8/2003 | Bawendi et al. | |
| 6,788,453 B2 | 9/2004 | Banin et al. | |
| 6,821,337 B2 | 11/2004 | Bawendi et al. | |
| 6,861,155 B2 | 3/2005 | Bawendi et al. | |
| 6,949,206 B2 | 9/2005 | Whiteford et al. | |
| 7,041,371 B2* | 5/2006 | Ogura | C30B 7/00 428/403 |
| 7,060,243 B2 | 6/2006 | Bawendi et al. | |
| 7,125,605 B2 | 10/2006 | Bawendi et al. | |
| 7,138,098 B2 | 11/2006 | Bawendi et al. | |
| 7,267,875 B2 | 9/2007 | Whiteford et al. | |
| 7,374,807 B2 | 5/2008 | Parce et al. | |
| 7,374,824 B2 | 5/2008 | Bawendi et al. | |
| 7,557,028 B1 | 7/2009 | Scher et al. | |
| 7,566,476 B2 | 7/2009 | Bawendi et al. | |
| 7,645,397 B2 | 1/2010 | Parce et al. | |
| 8,062,967 B1 | 11/2011 | Scher et al. | |
| 8,101,234 B2 | 1/2012 | Bawendi et al. | |
| 8,158,193 B2 | 4/2012 | Bawendi et al. | |
| 8,282,412 B1 | 10/2012 | Yaguchi et al. | |
| 8,337,720 B2 | 12/2012 | McCairn et al. | |
| 8,512,755 B2 | 8/2013 | Medintz et al. | |
| 8,563,133 B2 | 10/2013 | Whiteford et al. | |
| 9,169,435 B2 | 10/2015 | Guo et al. | |
| 2008/0039816 A1* | 2/2008 | Svarovsky | A61K 31/70 604/503 |
| 2008/0237540 A1 | 10/2008 | Dubrow | |
| 2008/0281010 A1 | 11/2008 | Lefas | |
| 2010/0110728 A1 | 5/2010 | Dubrow et al. | |
| 2011/0262752 A1 | 10/2011 | Bawendi et al. | |
| 2011/0263062 A1 | 10/2011 | Bawendi et al. | |

(Continued)

FOREIGN PATENT DOCUMENTS

| | | | |
|---|---|---|---|
| WO | WO 2015/101777 A1 | 7/2013 | |
| WO | WO 2016/168048 A1 | 10/2016 | |

OTHER PUBLICATIONS

Mei. B., et al., "Polyethylene glycol-based bidentate ligands to enhance quantum dot and gold nanoparticle stability in biological media" Nature Protocols 4: 412-423, Nature Publishing Group. United Kingdom (2009).*

Battaglia, D. and Peng, X., "Formation of High Quality InP and InAs Nanocrystals in a Noncoordinating Solvent," *Nano Letters* 2(9):1027-1030, American Chemical Society, United States (2002).

Borchert, H., et al., "Investigation of ZnS Passivated InP Nanocrystals by XPS," *Nano Letters* 2(2):151-154, American Chemical Society, United States (2002).

Cros-Gagneux, A., et al., "Surface Chemistry of InP Quantum Dots: A Comprehensive Study," *J. Am. Chem. Soc.* 132:18147-18157, American Chemical Society, United States (2010).

(Continued)

*Primary Examiner* — C. Melissa Koslow
(74) *Attorney, Agent, or Firm* — Sterne, Kessler, Goldstein & Fox P.L.L.C.

(57) ABSTRACT

The present invention provides nanostructure compositions and methods of producing nanostructure compositions. The nanostructure compositions comprise a population of nanostructures comprising thiol-functionalized ligands to increase the stability of the composition in thiol resins. The present invention also provides nanostructure films comprising a population of nanostructures comprising thiol-functionalized ligands and methods of making nanostructure films using these nanostructures.

21 Claims, 12 Drawing Sheets

(56) References Cited

U.S. PATENT DOCUMENTS

| | | | |
|---|---|---|---|
| 2013/0243874 A1 | 9/2013 | Duxin et al. | |
| 2015/0226699 A1* | 8/2015 | Li | G01N 27/308 205/777.5 |
| 2015/0236195 A1 | 8/2015 | Guo et al. | |

OTHER PUBLICATIONS

Guzelian, A.A., et al, "Colloidal chemical synthesis and characterization of InAs nanocrystal quantum dots," *Appl. Phys. Lett.* 69(10):1432-1434, American Institute of Physics, United States (1996).

Guzelian, A.A., et al, "Synthesis of Size-Selected, Surface-Passivated InP Nanocrystals," *J. Phys. Chem.* 100:7212-7219, American Chemical Society, United States (1996).

Haubold, S., et al., "Strongly Luminescent InP/ZnS Core-Shell Nanoparticles," *ChemPhysChem* 5:331-334, Wiley-VCH-Verlag GmbH, Germany (2001).

Hussain, S., et al, "One-Pot Fabrication of High-Quality InP/ZnS (Core/Shell) Quantum Dots and Their Application to Cellular Imaging," *ChemPhysChem* 10:1466-1470, Wiley-VCH Verlag GmbH, Germany (2009).

Kim, S., et al., "Highly Luminescent InP/GaP/ZnS Nanocrystals and Their Application to White Light-Emitting Diodes," *J. Am. Chem. Soc.* 134:3804-3809, American Chemical Society, United States (2012).

Li, L., et al. "Economic Synthesis of High Quality InP Nanocrystals Using Calcium Phosphide as the Phosphorus Precursor," *Chem. Mater.* 20:2621-2623, American Chemical Society, United States (2008).

Li, L. and Reiss, P., "One-pot Synthesis of Highly Luminescent InP/ZnS Nanocrystals without Precursor Injection," *J. Am. Chem. Soc.* 130:11588-11589, American Chemical Society, United States (2008).

Lim, J., et al., "InP@ZnSeS, Core@Composition Gradient Shell Quantum Dots with Enhanced Stability," *Chemistry of Materials* 23:4459-4463, American Chemical Society, United States (2011).

Liu, Z., et al.,"Coreduction Colloidal Synthesis of III-V Nanocrystals: The Case of InP," *Angew. Chem. Int. Ed.* 47:3540-3542, Wiley-VCH Verlag GmbH & Co, Germany (2008).

Lucey, D.W., et al.,"Monodispersed InP Quantum Dots Prepared by Colloidal Chemistry in a Noncoordinating Solvent," *Chem. Mater.* 17:3754-3762, American Chemical Society, United States (2005).

Mićić, O. I., et al., "Synthesis and characterization of InP, GaP, and GaInP$_2$ quantum dots," *J. Phys. Chem.* 99:7754-7759, American Chemical Society, United States (1995).

Mićić, O. I., et al., "Size-Dependent Spectroscopy of InP Quantum Dots," *J. Phys. Chem. B* 101:4904-4912, American Chemical Society, United States (1997).

Mićić, O. I., et al., "Core-Shell Quantum Dots of Lattice-Matched ZnCdSe$_2$ Shells on InP Cores: Experiment and Theory," *J. Phys. Chem. B* 104:12149-12156, American Chemical Society, United States (2000).

Nann, T., et al., "Water Splitting by Visible Light: A Nanophotocathode for Hydrogen Production," *Angew. Chem. Int. Ed.* 49:1574-1577, Wiley-VCH Verlag GmbH & Co., Germany (2010).

Owen, J., et al., "Reaction Chemistry and Ligand Exchange at Cadmium-Selenide Nanocrystal Surfaces," *J. Am. Chem. Soc.* 130:12279-12281, American Chemical Society, United States (2008).

Wells, R.L., et al., "Use of Tris(trimethylsilyl)arsine To Prepare Gallium Arsenide and Indium Arsenide," *Chemistry of Materials* 1(1):4-6, American Chemical Society, United States (1989).

Xie, R., et al.,"Colloidal InP Nanocrystals as Efficient Emitters Covering Blue to Near-Infrared," *J. Am. Chem. Soc.* 129:15432-15433, American Chemical Society, United States (2007).

Xu, S., et al., "Rapid Synthesis of High-Quality InP Nanocrystals," *J. Am. Chem. Soc.* 128:1054-1055, American Chemical Society, United States (2006).

Zan, F., et al., "Experimental Studies on Blinking Behavior of Single InP/ZnS Quantum Dots: Effects of Synthetic Conditions and UV Irradiation," *J. Phys. Chem. C* 116:3944-3950, American Chemical Society, United States (2012).

Ziegler, J., et al., "Silica-Coated InP/ZnS Nanocrystals as Converter Material in White LEDs," *Adv. Mater* 20:4068-4073, Wiley-VCH Verlag GmbH & Co., Germany (2008).

International Search Report and Written Opinion for International Application No. PCT/US2018/036407 European Patent Office, Netherlands, dated Aug. 30, 2018, 11 pages.

\* cited by examiner

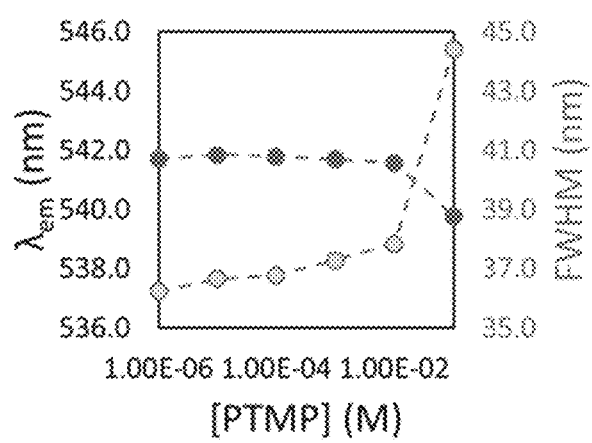 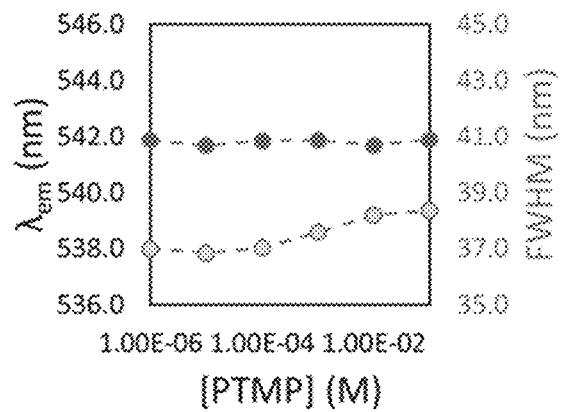
FIGURE 3A                    FIGURE 3B

THIOLATED HYDROPHILIC LIGANDS FOR IMPROVED QUANTUM DOT RELIABILITY IN RESIN FILMS

BACKGROUND OF THE INVENTION

Field of the Invention

The present invention provides nanostructure compositions and methods of producing nanostructure compositions. The nanostructure compositions comprise a population of nanostructures comprising thiolated ligands and a thiol-functionalized resin. The thiolated ligands increase the stability of the nanostructures in the thiol-functionalized resins. The present invention also provides nanostructure films comprising the nanostructure compositions and methods of making nanostructure films using the nanostructure compositions.

Background of the Invention

Synthetic methods that enable the preparation of quantum dots with accurate control of their properties afford nanocrystals whose surface is coated with a layer of highly hydrophobic molecular ligands. These quantum dots are therefore (moderately) soluble only in apolar organic solvents such as toluene, hexane, or chloroform. Several applications of quantum dots, however require water soluble nanocrystals. This objective can be reached with the functionalization of the nanocrystals' surface by appropriate molecular ligands. For example, a series of poly(ethylene glycol)-based bidentate ligands were produced that showed a strong interaction with CdSe/ZnS (core/shell) quantum dots and gold nanoparticles and promoted their dispersion in aqueous solutions. Bing, C. M., et al., *Nature Protocols* 4:412-423 (2009). However, Owen, J. S., et al., *J. Am. Chem. Soc.* 130(37):12279-12281 (2008) found that ligand exchange of octadecylphosphonate ligands with —S—($CH_2CH_2O)_4OCH_3$ resulted in the binding of the thiol to the nanoparticle surface but caused quenching of the nanoparticle fluorescence.

Organic molecules bind to the inorganic surfaces of quantum dots providing both colloidal stability and terminating the crystalline lattice of the material reducing the number of surface trap states caused by dangling bonds. As-synthesized quantum dots produced from the reaction of metal carboxylates (i.e, metal oleates, stearates, laurates, etc.) with chalcogenide precursors result in the formation of a metal-rich quantum dot surface terminated primarily by metal carboxylate ligands. Additionally, for reactions utilizing primary alkyl thiols as the sulfur precursor, unreacted thiol species can also serve as ligands.

The native ligand set (including metal carboxylates, metal thiolates, and thiols) are hydrophobic and do not provide adequate colloidal stability in the resin systems used to form the quantum dot enhancement film (QDEF) product. Ligand exchange procedures have been performed using either a polyethylene glycol (PEG) based polymeric ligand functionalized with an amine or a carboxylic acid. For some quantum dots, the PEG-based polymeric ligands with amine functional groups cannot be used since exposure to primary amines results in severe quenching of the photoluminescence quantum yield. Ligand exchange with carboxylic acid functionalized polymeric ligands results in nominal solubility in various resin formulations, however challenges remain regarding broadening of the full width at half-maximum (FWHM) upon ligand exchange, the reliability of the QDEF product under high-flux testing conditions, and early-time variations in the emission power (i.e, burn in). A potential cause for these concerns is that exposure to thiol functional groups present in many resin formulations can result in the displacement of carboxylate groups and disruption of the quantum dot colloidal stability.

Metal thiolate bonds have been found to be stronger than both metal carboxylate and metal phosphonate bonds and exposure to thiols or the corresponding deprotonated thiolate results in displacement of the carboxylate ligand from the surface as a carboxylic acid. Furthermore, thiols can also bind to the surface of nanocrystals as neutral L-type ligands occupying sites left open by the surface packing of metal carboxylate ligands. Either mechanism—displacement of the polymeric carboxylic ligands or the aggregation of multiple quantum dots by multifunctional thiol molecules present in the resin formulations—can result in undesirable deterioration of the quantum dot optical properties.

A need exists to prepare nanostructure compositions and/or resin mixes that have improved stability and result in improved optical properties when used to prepare a nanostructure film.

BRIEF SUMMARY OF THE INVENTION

The disclosure provides a composition comprising:
(a) a nanostructure; and
(b) thiolated ligands bound to the surface of the nanostructure, wherein the thiolated ligands comprise a poly(ethylene oxide)/poly(propylene oxide) block copolymer, a poly(ethylene oxide) block copolymer, or a poly(propylene oxide) block copolymer.

In some embodiments, the composition comprises thiolated ligands having the formula:

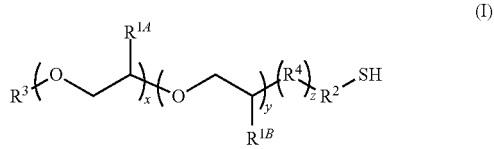

(I)

wherein:
x is 1 to 100;
y is 1 to 100;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido.

In some embodiments, the composition comprises thiolated ligands having the formula:

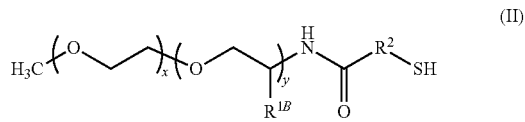

(II)

wherein:
x is 1 to 100;
y is 1 to 100;
$R^{1B}$ is H or $C_{1-20}$ alkyl; and
$R^2$ is $C_{1-20}$ alkyl.

In some embodiments, the composition comprises a nanostructure, wherein the nanostructure comprises a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the composition comprises a nanostructure, wherein the nanostructure comprises a core of InP.

In some embodiments, the composition comprises a nanostructure, wherein the nanostructure comprises at least one shell.

In some embodiments, the composition comprises a nanostructure, wherein the nanostructure comprises two shells.

In some embodiments, the composition comprises a nanostructure, wherein the nanostructure comprises at least one shell and the at least one shell comprises a mixture of at least two materials selected from the group consisting of zinc, sulfur, selenium, tellurium, and cadmium.

In some embodiments, the composition comprises a nanostructure, wherein the nanostructure comprises two shells and wherein one shell comprises a mixture of zinc and sulfur and one shell comprises a mixture of zinc and selenium.

In some embodiments, the composition comprises thiolated ligands of formula I, wherein x is 10 to 20. In some embodiments, the composition comprises thiolated ligands of formula II, wherein x is 10 to 20.

In some embodiments, the composition comprises thiolated ligands of formula I, wherein y is 1 to 10. In some embodiments, the composition comprises thiolated ligands of formula II, wherein y is 1 to 10.

In some embodiments, the composition comprises thiolated ligands of formula I, $R^{1B}$ is $C_{1-5}$ alkyl. In some embodiments, the composition comprises thiolated ligands of formula II, wherein $R^{1B}$ is $C_{1-5}$ alkyl.

In some embodiments, the composition comprises thiolated ligands of formula I, wherein $R^2$ is —$CH_2CH_2$—. In some embodiments, the composition comprises thiolated ligands of formula I, wherein $R^2$ is —$CH_2CH_2$—.

In some embodiments, the composition comprises a nanostructure comprising an InP core and two shells, and thiolated ligands of formula I, wherein x is 19, y is 3, $R^{1B}$ is $CH_3$, and $R^2$ is —$CH_2CH_2$—. In some embodiments, the composition comprises a nanostructure comprising an InP core and two shells, and thiolated ligands of formula II, wherein x is 19, y is 3, $R^{1B}$ is $CH_3$, and $R^2$ is —$CH_2CH_2$—.

The disclosure provides a nanostructure composition, comprising:
(a) at least one population of nanostructures, wherein between about 20 and about 100 mole percent of ligands in at least one population of nanostructures comprise a thiolated ligand bound to the nanostructure; and
(b) at least one organic resin, wherein at least one organic resin is a thiol-functionalized resin.

In some embodiments, the nanostructure composition comprises between one and five populations of nanostructures.

In some embodiments, the nanostructure composition comprises one population of nanostructures.

In some embodiments, the at least one population of nanostructures in the nanostructure composition contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the at least one population of nanostructures in the nanostructure composition comprises as a weight percentage between about 0.0001% and about 2% of the total weight of the nanostructure composition.

In some embodiments, the thiolated ligands in the at least one population of nanostructures in the nanostructure composition comprise a poly(ethylene oxide)/poly(propylene oxide) block copolymer, a poly(ethylene oxide) block copolymer, or a poly(propylene oxide) block copolymer.

In some embodiments, the thiolated ligands in the at least one population of nanostructures in the nanostructure composition have the formula:

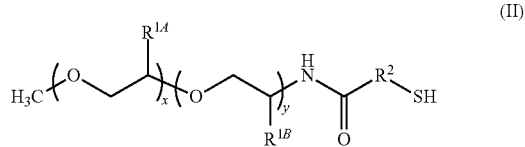

(II)

wherein:
x is 1 to 100;
y is 1 to 100;
$R^{1A}$ and $R^{1B}$ independently are H or $C_{1-20}$ alkyl; and
$R^2$ is $C_{1-20}$ alkyl.

In some embodiments, the thiolated ligands in the at least one population of nanostructures in the nanostructure composition have the formula II, wherein x is 10 to 20.

In some embodiments, the thiolated ligands in the at least one population of nanostructures in the nanostructure composition have the formula II, wherein y is 1 to 10.

In some embodiments, the thiolated ligands in the at least one population of nanostructures in the nanostructure composition have the formula II, wherein $R^{1A}$ is H and $R^{1B}$ is $C_{1-5}$ alkyl.

In some embodiments, the thiolated ligands in the at least one population of nanostructures in the nanostructure composition have the formula II, wherein $R^2$ is —$CH_2CH_2$—.

In some embodiments, the nanostructure composition comprises between one and five organic resins.

In some embodiments, the nanostructure composition comprises one organic resin.

In some embodiments, at least one organic resin in the nanostructure composition is a thermosetting resin or a UV curable resin.

In some embodiments, at least one organic resin in the nanostructure composition is a UV curable resin.

In some embodiments, at least one organic resin in the nanostructure composition is a mercaptofunctional compound.

In some embodiments, the at least one organic resin in the nanostructure composition is a polythiol.

In some embodiments, the at least one organic resin in the nanostructure composition is selected from the group consisting of trimethylol-propane tri(3-mercaptopropionate), glycol di(3-mercapto-propionate), tris[25-(3-mercaptopropionyloxy)ethyl]isocyanurate, di-pentaerythritol hexa(3-mercaptopropionate), ethoxylated trimethylolpropane tri(3-mercaptopropionate), polycaprolactone tetra(3-mercaptopropionate), pentaerythritol tetramercaptoacetate, trimethylol-propane trimercaptoacetate, glycol dimercaptoacetate, and pentaerythritol tetrakis(3-mercaptopropionate).

In some embodiments, the nanostructure composition comprises as a weight percentage between about 5% and about 50% of the at least one organic resin.

In some embodiments, between about 30 and about 100 mole percent of ligands in at least one population of nanostructures in the nanostructure composition comprise a thiolated ligand bound to the nanostructure.

In some embodiments, between about 40 and about 100 mole percent of ligands in at least one population of nanostructures in the nanostructure composition comprise a thiolated ligand bound to the nanostructure.

In some embodiments, the nanostructure composition further comprises an organic solvent.

In some embodiments, the nanostructures in the nanostructure composition are quantum dots.

In some embodiments, at least one population of nanostructures in the nanostructure composition comprises an InP core and at least two shells and the at least one organic resin is pentaerythritol tetrakis(3-mercaptopropionate).

In some embodiments, the nanostructure composition is stable for between about 1 day and about 3 years when stored at a temperature between about 10° C. and about 90° C.

In some embodiments, the nanostructure composition is stable for between about 1 month and about 3 years when stored at a temperature between about 10° C. and about 90° C.

In some embodiments, a molded article comprises the nanostructure composition. In some embodiments, the molded article is a film, a substrate for a display, or a light emitting diode. In some embodiments, the molded article is a film.

The disclosure provides a method of replacing a first ligand on a nanostructure with a second ligand comprising admixing a reaction mixture comprising a population of nanostructures having a first ligand non-covalently bound to the nanostructure and a second ligand which is a thiolated ligand, such that the second ligand displaces the first ligand and becomes non-covalently bound to the nanostructure, wherein the thiolated ligand has the formula:

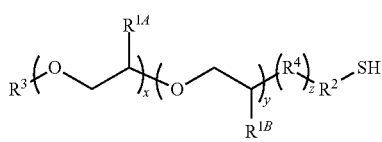

(I)

wherein:
x is 1 to 100;
y is 1 to 100;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido.

In some embodiments, the method of replacing a first ligand on a nanostructure with a second ligand comprises a second ligand which is a thiolated ligand having the formula:

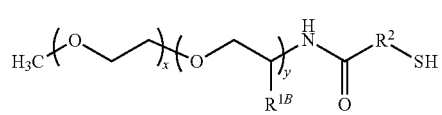

(II)

wherein:
x is 1 to 100;
y is 1 to 100;
$R^{1B}$ is H or $C_{1-20}$ alkyl; and
$R^2$ is $C_{1-20}$ alkyl.

In some embodiments, the method of replacing a first ligand on a nanostructure with a second ligand comprises a nanostructure comprising a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the method of replacing a first ligand on a nanostructure with a second ligand comprises a nanostructure comprising a core of InP.

In some embodiments, the method of replacing a first ligand on a nanostructure with a second ligand comprises a nanostructure comprising at least one shell.

In some embodiments, the method of replacing a first ligand on a nanostructure with a second ligand comprises a nanostructure comprising two shells.

In some embodiments, the method of replacing a first ligand on a nanostructure with a second ligand comprises a nanostructure comprising at least one shell and the at least one shell comprises a mixture of at least two materials selected from the group consisting of zinc, sulfur, selenium, tellurium, and cadmium.

In some embodiments, the method of replacing a first ligand on a nanostructure with a second ligand comprises a nanostructure comprising two shells and wherein one shell comprises a mixture of zinc and sulfur and one shell comprises a mixture of zinc and selenium.

In some embodiments, the method of replacing a first ligand on a nanostructure with a second ligand comprises a second ligand which is a thiolated ligand having formula I, wherein x is 10 to 20. In some embodiments, the method of replacing a first ligand on a nanostructure with a second ligand comprises a second ligand which is a thiolated ligand having formula II, wherein x is 10 to 20.

In some embodiments, the method of replacing a first ligand on a nanostructure with a second ligand comprises a second ligand which is a thiolated ligand having formula I, wherein y is 1 to 10. In some embodiments, the method of replacing a first ligand on a nanostructure with a second ligand comprises a second ligand which is a thiolated ligand having formula II, wherein y is 1 to 10.

In some embodiments, the method of replacing a first ligand on a nanostructure with a second ligand comprises a second ligand which is a thiolated ligand having formula I, wherein $R^{1A}$ is H and $R^{1B}$ is $C_{1-5}$ alkyl. In some embodiments, the method of replacing a first ligand on a nanostructure with a second ligand comprises a second ligand which is a thiolated ligand having formula II, wherein $R^{1A}$ is H and $R^{1B}$ is $C_{1-5}$ alkyl.

In some embodiments, the method of replacing a first ligand on a nanostructure with a second ligand comprises a second ligand which is a thiolated ligand having formula I, wherein $R^2$ is —$CH_2CH_2$—. In some embodiments, the method of replacing a first ligand on a nanostructure with a second ligand comprises a second ligand which is a thiolated ligand having formula II, wherein $R^2$ is —$CH_2CH_2$—.

In some embodiments, the method of replacing a first ligand on a nanostructure with a second ligand comprises the second ligand displacing between about 20% and about 100% of the first ligand on the nanostructure. In some embodiments, the method of replacing a first ligand on a nanostructure with a second ligand comprises the second ligand displacing between about 30% and about 100% of the first ligand on the nanostructure. In some embodiments, the method of replacing a first ligand on a nanostructure with a second ligand comprises the second ligand displacing between about 40% and about 100% of the first ligand on the nanostructure.

In some embodiments, the method of replacing a first ligand on a nanostructure with a second ligand comprises a nanostructure comprising an InP core and two shells, and a second ligand which is a thiolated ligand having formula I, wherein x is 19, y is 3, $R^{1B}$ is $CH_3$, and $R^2$ is —$CH_2CH_2$—. In some embodiments, the method of replacing a first ligand on a nanostructure with a second ligand comprises a nanostructure comprising an InP core and two shells, and a second ligand which is a thiolated ligand having formula II, wherein x is 19, y is 3, $R^{1B}$ is $CH_3$, and $R^2$ is —$CH_2CH_2$—.

The disclosure provides a method of preparing a nanostructure composition, the method comprising:
  (a) providing a composition comprising at least one population of nanostructures, wherein between about 20 and about 100 mole percent of ligands in the population of nanostructures comprise a thiolated ligand bound to the nanostructure; and
  (b) admixing at least one organic resin with the composition of (a), wherein at least one organic resin is a thiol-functionalized resin.

In some embodiments, the method of preparing a nanostructure composition comprises providing a composition comprising between one and five populations of nanostructures.

In some embodiments, the method of preparing a nanostructure composition comprises providing a composition comprising one population of nanostructures.

In some embodiments, the method of preparing a nanostructure composition comprises providing a composition comprising at least one population of nanostructures, wherein the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the method of preparing a nanostructure composition comprises providing a composition, wherein the composition comprises as a weight percentage between about 0.0001% and about 2% of the at least one population of nanostructures.

In some embodiments, the method of preparing a nanostructure composition comprises providing a composition comprising at least one population of nanostructures, wherein the nanostructures comprise at least one shell.

In some embodiments, the method of preparing a nanostructure composition comprises providing a composition comprising at least one population of nanostructures, wherein the nanostructures comprise two shells.

In some embodiments, the method of preparing a nanostructure composition comprises providing a composition comprising at least one population of nanostructures, wherein the nanostructures comprise at least one shell and the at least one shell comprises a mixture of at least two materials selected from the group consisting of zinc, sulfur, selenium, tellurium, and cadmium.

In some embodiments, the method of preparing a nanostructure composition comprises providing a composition comprising at least one population of nanostructures, wherein the nanostructures comprises two shells and wherein one shell comprises a mixture of zinc and sulfur and one shell comprises a mixture of zinc and selenium.

In some embodiments, the method of preparing a nanostructure composition comprises providing a composition comprising at least one population of nanostructures, wherein the nanostructures comprise a thiolated ligand having the formula:

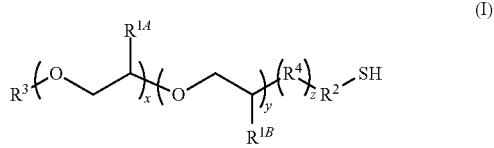

wherein:
  x is 1 to 100;
  y is 1 to 100;
  z is 0 or 1;
  $R^{1A}$ and $R^{1B}$ independently are H or $C_{1-20}$ alkyl;
  $R^2$ is $C_{1-20}$ alkyl;
  $R^3$ is $C_{1-20}$ alkyl, $C_{3-8}$ cycloalkyl, or $C_{6-14}$ aryl; and
  $R^4$ is —O—, $C_{1-20}$ alkyl, or amido.

In some embodiments, the method of preparing a nanostructure composition comprises providing a composition comprising at least one population of nanostructures, wherein the nanostructures comprise a thiolated ligand having the formula:

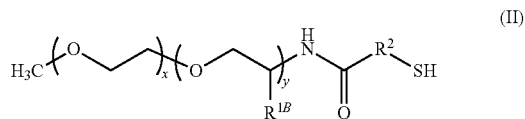

wherein.
  x is 1 to 100;
  y is 1 to 100;
  $R^{1B}$ is H or $C_{1-20}$ alkyl; and
  $R^2$ is $C_{1-20}$ alkyl.

In some embodiments, the method of preparing a nanostructure composition comprises providing a composition comprising at least one population of nanostructures, wherein the nanostructures comprise a thiolated ligand having the formula I, wherein x is 10 to 20. In some embodiments, the method of preparing a nanostructure composition comprises providing a composition comprising at least one population of nanostructures, wherein the nanostructures comprise a thiolated ligand having the formula II, wherein x is 10 to 20.

In some embodiments, the method of preparing a nanostructure composition comprises providing a composition comprising at least one population of nanostructures, wherein the nanostructures comprise a thiolated ligand having the formula I, wherein y is 1 to 10. In some embodiments, the method of preparing a nanostructure composition comprises providing a composition comprising at least one population of nanostructures, wherein the nanostructures comprise a thiolated ligand having the formula II, wherein y is 1 to 10.

In some embodiments, the method of preparing a nanostructure composition comprises providing a composition comprising at least one population of nanostructures, wherein the nanostructures comprise a thiolated ligand having the formula I, wherein $R^{1B}$ is $C_{1-5}$ alkyl. In some embodiments, the method of preparing a nanostructure composition comprises providing a composition comprising at least one population of nanostructures, wherein the nanostructures comprise a thiolated ligand having the formula II, wherein $R^{1B}$ is $C_{1-5}$ alkyl.

In some embodiments, the method of preparing a nanostructure composition comprises providing a composition comprising at least one population of nanostructures, wherein the nanostructures comprise a thiolated ligand having the formula I, wherein $R^2$ is —CH$_2$CH$_2$—. In some embodiments, the method of preparing a nanostructure composition comprises providing a composition comprising at least one population of nanostructures, wherein the nanostructures comprise a thiolated ligand having the formula II, wherein $R^2$ is —CH$_2$CH$_2$—.

In some embodiments, the method of preparing a nanostructure composition comprises providing a composition comprising at least one population of nanostructures, wherein the nanostructure comprises an InP core and two shells, and wherein in formula I, x is 19, y is 3, $R^{1B}$ is CH$_3$, and $R^2$ is —CH$_2$CH$_2$—. In some embodiments, the method of preparing a nanostructure composition comprises providing a composition comprising at least one population of nanostructures, wherein the nanostructure comprises an InP core and two shells, and wherein in formula II, x is 19, y is 3, $R^{1B}$ is CH$_3$, and $R^2$ is —CH$_2$CH$_2$—.

In some embodiments, the method of preparing a nanostructure composition comprises admixing between one and five organic resins.

In some embodiments, the method of preparing a nanostructure composition comprises admixing one organic resin.

In some embodiments, the method of preparing a nanostructure composition comprises admixing at least one organic resin, wherein at least one organic resin is a thermosetting resin or a UV curable resin.

In some embodiments, the method of preparing a nanostructure composition comprises admixing at least one organic resin, wherein at least one organic resin is a UV curable resin.

In some embodiments, the method of preparing a nanostructure composition comprises admixing at least one organic resin, wherein the at least one organic resin is a polythiol-functionalized resin.

In some embodiments, the method of preparing a nanostructure composition comprises admixing at least one organic resin, wherein the at least one organic resin is selected from the group consisting of trimethylol-propane tri(3-mercaptopropionate), glycol di(3-mercapto-propionate), tris[25-(3-mercaptopropionyloxy)ethyl]isocyanurate, di-pentaerythritol hexa(3-mercaptopropionate), ethoxylated trimethylolpropane tri(3-mercaptopropionate), polycaprolactone tetra(3-mercaptopropionate), pentaerythritol tetramercaptoacetate, trimethylol-propane trimercaptoacetate, glycol dimercaptoacetate, and pentaerythritol tetrakis (3-mercaptopropionate).

In some embodiments, the method of preparing a nanostructure composition comprises admixing at least one organic resin, wherein the nanostructure composition comprises as a weight percentage between about 5% and about 50% of the at least one organic resin.

In some embodiments, the method of preparing a nanostructure composition comprises providing a composition comprising at least one population of nanostructures, wherein between about 30 and about 100 mole percent of ligands in at least one population of nanostructures comprise a thiolated ligand bound to the nanostructure.

In some embodiments, the method of preparing a nanostructure composition comprises providing a composition comprising at least one population of nanostructures, wherein between about 40 and about 100 mole percent of ligands in at least one populations of nanostructures comprise a thiolated ligand bound to the nanostructure.

In some embodiments, the method of preparing a nanostructure composition comprises providing a composition comprising at least one population of nanostructures, wherein the nanostructures are quantum dots.

In some embodiments, the method of preparing a nanostructure composition comprises admixing at least one organic resin, wherein the admixing is at an agitation rate between 100 rpm and 10,000 rpm.

In some embodiments, the method of preparing a nanostructure composition comprises admixing at least one organic resin, wherein the admixing is for a time of between 1 minutes and 24 hours.

The disclosure provides a nanostructure film layer comprising:
  (a) at least one population of nanostructures, wherein between about 20 and about 100 mole percent of ligands in the population of nanostructures comprise a thiolated ligand bound to the nanostructure; and
  (b) at least one organic resin, wherein at least one organic resin is a thiol-functionalized resin.

In some embodiments, the nanostructure film layer comprises between one and five populations of nanostructures.

In some embodiments, the nanostructure film layer comprises one population of nanostructures.

In some embodiments, the nanostructure film layer comprises at least one population of nanostructures, wherein the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

In some embodiments, the nanostructure film layer comprises at least one population of nanostructures, wherein the at least one population of nanostructures comprises as a weight percentage between about 0.0001% and about 2% of the total weight of the nanostructure film layer.

In some embodiments, the nanostructure film layer comprises between one and five organic resins.

In some embodiments, the nanostructure film layer comprises one organic resin.

In some embodiments, the nanostructure film layer comprises at least one organic resin, wherein the at least one organic resin is a thermosetting resin or a UV curable resin.

In some embodiments, the nanostructure film layer comprises at least one organic resin, wherein the at least one organic resin is a UV curable resin.

In some embodiments, the nanostructure film layer comprises at least one organic resin, wherein the at least one organic resin is a polythiol-functionalized resin.

In some embodiments, the nanostructure film layer comprises at least one organic resin, wherein the at least one organic resin is selected from the group consisting of trimethylol-propane tri(3-mercaptopropionate), glycol di(3-mercapto-propionate), tris[25-(3-mercaptopropionyloxy)ethyl]isocyanurate, di-pentaerythritol hexa(3-mercaptopropionate), ethoxylated trimethylolpropane tri(3-mercaptopropionate), polycaprolactone tetra(3-mercaptopropionate), pentaerythritol tetramercaptoacetate, trimethylol-propane trimercaptoacetate, glycol dimercaptoacetate, and pentaerythritol tetrakis(3-mercaptopropionate).

In some embodiments, the nanostructure film layer comprises at least one organic resin, wherein the at least one organic resin comprises as a weight percentage between 5% and 50% of the total weight of the nanostructure composition.

In some embodiments, the nanostructure film layer comprises at least one population of nanostructures, wherein the nanostructures are quantum dots.

In some embodiments, the nanostructure film layer comprises at least one population of nanostructures, wherein the nanostructures are quantum dots, wherein the quantum dots are InP and/or CdSe quantum dots.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 3A is a graph showing peak position and full width at half-maximum (FWHM) for samples exchanged with M1000-SA in toluene with pentaerythritol tetrakis(3-mercaptopropionate) (PTMP) at a concentration of $1\times10^{-6}$ to $1\times10^{-1}$ M.

FIG. 3B is a graph showing peak position and full width at half-maximum (FWHM) for samples exchanged with M1000-SH in toluene with PTMP at a concentration of $1\times10^{-6}$ to $1\times10^{-1}$ M.

DETAILED DESCRIPTION OF THE INVENTION

Figure 1:
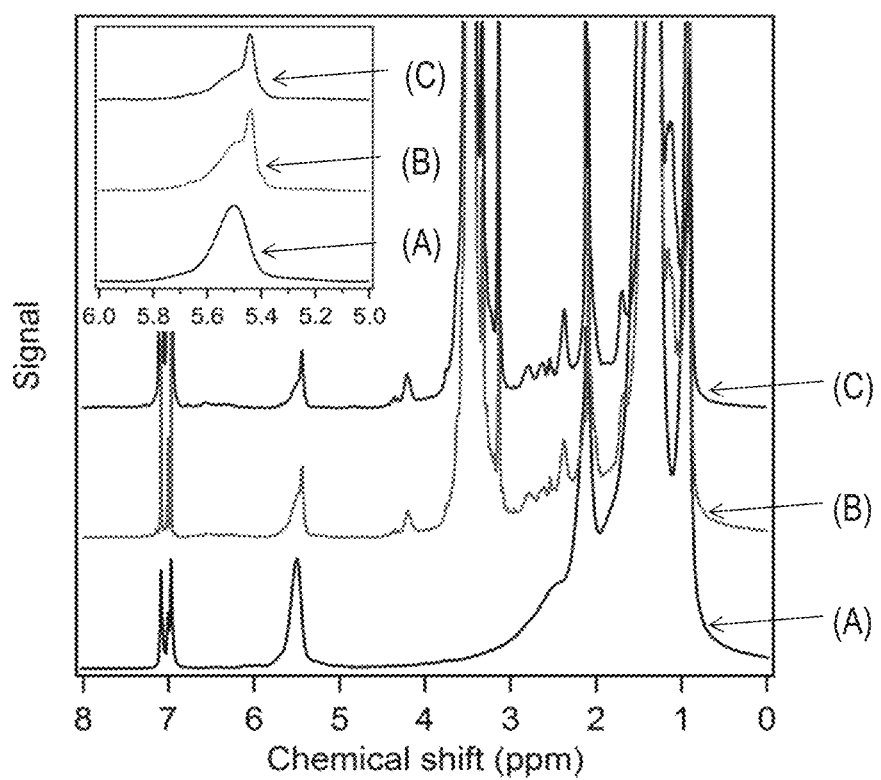
FIG. 1 is a graph showing $^1$H NMR data for (A) cleaned starting material showing broad, bound ligand signals and samples after (B) ligand exchange with M1000-SH (2.5 mg/OD/mL); and (C) ligand exchange with M1000-SH (5.0 mg/OD/mL). The inset highlights the vinyl region between 5.0 and 6.0 ppm where the displacement of oleate ligands from the quantum dot surface can be measured by the ratio of the area of the bound (broad, downfield) and free (narrow, upfield) peaks.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in practice for testing, the preferred materials and methods are described herein. Accordingly, the terminology used herein is for the purpose of describing particular embodiments only, and is not intended to be limiting.

As used in this specification and the appended claims, the singular forms "a," "an," and "the" include plural referents unless the context clearly dictates otherwise. Thus, for example, reference to "a nanostructure" includes a plurality of such nanostructures, and the like.

The term "about" as used herein indicates the value of a given quantity varies by +10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest ax is of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long ax is of a nanowire, a long ax is of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) ax is of a nanowire or along a long ax is of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first ax is of the nanostructure, where the first ax is has the greatest difference in length with respect to the second and third axes (the second and third axes are the two axes whose lengths most nearly equal each other). The first ax is is not necessarily the longest ax is of the nanostructure; e.g., for a disk-shaped nanostructure, the cross-section would be a substantially circular cross-section normal to the short longitudinal ax is of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one ax is of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more facets of a nanostructure, e.g., through covalent, ionic, van der Waals, or other molecular interactions with the surface of the nanostructure.

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. In some embodiments, the solubilizing group is a long-chain alkyl, a long-chain heteroalkyl, a long-chain alkenyl, a long-chain alkynyl, a cycloalkyl, or an aryl.

As used herein, the term "stable" refers to a mixture or composition that resists change or decomposition due to internal reaction or due to the action of air, heat, light, pressure, or other natural conditions.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "functional group equivalent weight" (FGEW) is used to determine the ratio of the reactive functional groups in a polymer. The FGEW of a polymer is defined as the ratio of the number average molecular weight (NAMW) to the number of functional groups in the polymer (n). It is the weight of a polymer that contains one formula weight of the functional group. The FGEW is calculated using end-group analysis by counting the number of reactive functional groups and dividing into the number average molecular weight:

FGEW=NAMW/$n$ where n=the number of reactive functional groups in the monomer.

"Alkyl" as used herein refers to a straight or branched, saturated, aliphatic radical having the number of carbon atoms indicated. In some embodiments, the alkyl is $C_{1-2}$ alkyl, $C_{1-3}$ alkyl, $C_{14}$ alkyl, $C_{1-5}$ alkyl, $C_{1-6}$ alkyl, $C_{1-7}$ alkyl, $C_{1-8}$ alkyl, $C_{1-9}$ alkyl, $C_{1-10}$ alkyl, $C_{1-12}$ alkyl, $C_{1-14}$ alkyl, $C_{1-16}$ alkyl, $C_{1-18}$ alkyl, $C_{1-20}$ alkyl, $C_{8-20}$ alkyl, $C_{12-20}$ alkyl, $C_{14-20}$ alkyl, $C_{16-20}$ alkyl, or $C_{18-20}$ alkyl. For example, $C_{1-6}$ alkyl includes, but is not limited to, methyl, ethyl, propyl, isopropyl, butyl, isobutyl, sec-butyl, tert-butyl, pentyl, isopentyl, and hexyl. In some embodiments, the alkyl is octyl, nonyl, decyl, undecyl, dodecyl, tridecyl, tetradecyl, pentadecyl, hexadecyl, heptadecyl, octadecyl, nonadecyl, or icosanyl.

The term "alkylene," as used herein, alone or in combination, refers to a saturated aliphatic group derived from a straight or branched chain saturated hydrocarbon attached at two or more positions, such as methylene (—$CH_2$—). Unless otherwise specified, the term "alkyl" may include "alkylene" groups.

"Alkenyl" as used herein refers to a monovalent group derived from a straight- or branched-chain hydrocarbon moiety having at least one carbon-carbon double bond by the removal of a single hydrogen atom. In some embodiments, the alkenyl group contains 2-20 carbon atoms and is a $C_{2-20}$ alkenyl. In some embodiments, the alkenyl group contains 2-15 carbon atoms and is a $C_{2-15}$ alkenyl. In some embodiments, the alkenyl group contains 2-10 carbon atoms and is a $C_{2-10}$ alkenyl. In some embodiments, the alkenyl group contains 2-8 carbon atoms and is a $C_{2-8}$ alkenyl. In some embodiments, the alkenyl group contains 2-5 carbons and is a $C_{2-5}$ alkenyl. Alkenyl groups include, for example, ethenyl, propenyl, butenyl, and 1-methyl-2-buten-1-yl.

"Alkynyl" as used herein refers to a monovalent group derived from a straight- or branched-chain hydrocarbon having at least one carbon-carbon triple bond by the removal of a single hydrogen atom. In some embodiments, the alkynyl group contains 2-20 carbon atoms and is a $C_{2-20}$ alkynyl. In some embodiments, the alkynyl group contains 2-15 carbon atoms and is a $C_{2-15}$ alkynyl. In some embodiments, the alkynyl group contains 2-10 carbon atoms and is a $C_{2-10}$ alkynyl. In some embodiments, the alkynyl group contains 2-8 carbon atoms and is a $C_{2-8}$ alkynyl. In some embodiments, the alkynyl group contains 2-5 carbons and is a $C_{2-5}$ alkynyl. Representative alkynyl groups include, but are not limited to, ethynyl, 2-propynyl (propargyl), and 1-propynyl.

"Alkylamino" as used herein, refers to a "substituted amino" of the formula (—$NR^K{}_2$), wherein $R^K$ is, independently, a hydrogen or an optionally substituted alkyl group, as defined herein, and the nitrogen moiety is directly attached to the parent molecule.

"Heteroalkyl" as used herein, refers to an alkyl moiety which is optionally substituted with one or more functional groups, and that contain one or more oxygen, sulfur, nitrogen, phosphorus, or silicon atoms, e.g., in place of carbon atoms.

"Cycloalkyl" as used herein, refers to a monovalent or divalent group of 3 to 8 carbon atoms, preferably 3 to 5 carbon atoms derived from a saturated cyclic hydrocarbon. Cycloalkyl groups can be monocyclic or polycyclic. Cycloalkyl can be substituted by $C_{1-3}$ alkyl groups or halogens.

"Amido" as used herein, refers to both "aminocarbonyl" and "carbonylamino." These terms when used alone or in connection with another group refers to an amido group such as $N(R^L R^M)$—C(O)— or $R^M C(O)$—$N(R^L)$— when used terminally and —C(O)—$N(R^L)$— or —$N(R^M)$—C(O)— when used internally, wherein each of $R^L$ and $R^M$ is independently hydrogen, alkyl, cycloaliphatic, (cycloaliphatic) aliphatic, aryl, araliphatic, heterocycloaliphatic, (heterocycloaliphlatic)aliphatic, heteroaryl, carboxy, sulfanyl, sulfinyl, sulfonyl, (aliphatic)carbonyl, (cycloaliphatic)carbonyl, ((cycloaliphatic)aliphatic)carbonyl, arylcarbonyl, (araliphatic)carbonyl, (heterocycloaliphatic)carbonyl, ((heterocycloaliphatic)aliphatic)carbonyl, (heteroaryl)carbonyl, or (heteroaraliphatic)carbonyl, each of which being defined herein and being optionally substituted. Examples of amino groups include alkylamino, dialkylamino, or arylamino. Examples of amido groups include alkylamido (such as alkylcarbonylamino or alkylcarbonylamino), (heterocycloaliphatic)amido, (heteroaralkyl)amido, (heteroaryl)amido, (heterocycloalkyl)alkylamido, arylamido, aralkylamido, (cycloalkyl)alkylamido, or cycloalkylamido.

"Carboxyalkyl" as used herein, refers to a carboxylic acid group (—COOH) appended to a lower alkyl radical.

"Heterocycloalkyl" as used herein, refers to cycloalkyl substituents that have from 1 to 5, and more typically from 1 to 4 heteroatoms in the ring structure. Suitable heteroatoms employed in compounds are nitrogen, oxygen, and sulfur. Representative heterocycloalkyl moieties include, for example, morpholino, piperazinyl, piperidinyl, and the like.

"Aryl" as used herein refers to unsubstituted monocyclic or bicyclic aromatic ring systems having from six to fourteen carbon atoms, i.e., a $C_{6-14}$ aryl. Non-limiting exemplary aryl groups include phenyl, naphthyl, phenanthryl, anthracyl, indenyl, azulenyl, biphenyl, biphenylenyl, and fluorenyl groups. In one embodiment, the aryl group is a phenyl or naphthyl.

"Heteroaryl" or "heteroaromatic" as used herein refers to unsubstituted monocyclic and bicyclic aromatic ring systems having 5 to 14 ring atoms, i.e., a 5- to 14-membered heteroaryl, wherein at least one carbon atom of one of the rings is replaced with a heteroatom independently selected from the group consisting of oxygen, nitrogen, and sulfur. In one embodiment, the heteroaryl contains 1, 2, 3, or 4 heteroatoms independently selected from the group consisting of oxygen, nitrogen, and sulfur. In one embodiment, the heteroaryl has three heteroatoms. In another embodiment, the heteroaryl has two heteroatoms. In another embodiment, the heteroaryl has one heteroatom. In another embodiment, the heteroaryl is a 5- to 10-membered heteroaryl. In another embodiment, the heteroaryl is a 5- or 6-membered heteroaryl. In another embodiment, the heteroaryl has 5 ring atoms, e.g., thienyl, a 5-membered heteroaryl having four carbon atoms and one sulfur atom. In another embodiment, the heteroaryl has 6 ring atoms, e.g., pyridyl, a 6-membered heteroaryl having five carbon atoms and one nitrogen atom. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, O-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl), isoxazolyl (e.g., isoxazol-3-yl, isoxazol-4-yl, and isoxazol-5-yl), or indazolyl (e.g., 1H-indazol-3-yl). The term "heteroaryl" also includes possible N-oxides. A non-limiting exemplary N-oxide is pyridyl N-oxide.

Unless clearly indicated otherwise, ranges listed herein are inclusive.

A variety of additional terms are defined or otherwise characterized herein.

Nanostructure Composition

In some embodiments, the present invention provides a nanostructure composition comprising:
(a) a nanostructure; and
(b) thiolated ligands bound to the surface of the nanostructure, wherein the thiolated ligands comprise a poly(ethylene oxide)/poly(propylene oxide) block copolymer, a poly(ethylene oxide) block copolymer, or a poly(propylene oxide) block copolymer.

In some embodiments, the present invention provides a nanostructure composition comprising:
(a) a nanostructure; and
(b) thiolated ligands dispersed on the surface of the nanostructure, the thiolated ligands having the formula:

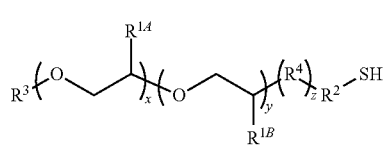

wherein:
x is 1 to 100;
y is 1 to 100;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido.

In some embodiments, the present invention provides a nanostructure composition comprising:
(a) a nanostructure; and
(b) thiolated ligands dispersed on the surface of the nanostructure, the thiolated ligands having the formula:

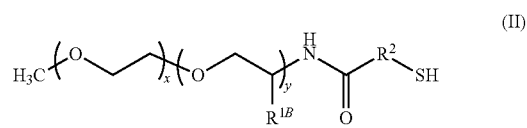

wherein:
x is 1 to 100;
y is 1 to 100;
$R^{1B}$ is H or $C_{1-20}$ alkyl; and
$R^2$ is $C_{1-20}$ alkyl.

In some embodiments, the present invention provides a nanostructure composition comprising:
(a) at least one population of nanostructures, wherein between about 20 and about 100 mole percent of ligands in at least one population of nanostructures comprise a thiolated ligand bound to the nanostructures; and
(b) at least one organic resin, wherein at least one organic resin is a thiol-functionalized resin.

In some embodiments, the nanostructure composition further comprises a solvent.

In some embodiments, the nanostructure is a quantum dot.

In some embodiments, the present invention provides a nanostructure film kit comprising:
(a) a first composition comprising at least one population of nanostructures, wherein between about 20 and about 100 mole percent of ligands in at least one population of nanostructures comprise a thiolated ligand bound to the nanostructures; and
(b) a second composition comprising at least one organic resin, wherein at least one organic resin is a thiol-functionalized resin; and
(c) instructions for preparing a nanostructure film.

In some embodiments, the nanostructure film kit further comprises a solvent.

In some embodiments, the nanostructure is a quantum dot.

In some embodiments, the present invention provides a nanostructure film kit comprising:
(a) a first composition comprising at least one population of nanostructures and at least one organic resin, wherein between about 20 and about 100 mole percent of ligands in at least one population of nanostructures comprise a thiolated ligand bound to the nanostructures, and wherein at least one organic resin is a thiol-functionalized resin; and
(b) instructions for preparing a nanostructure film.

In some embodiments, the nanostructure film kit further comprises a solvent.

In some embodiments, the nanostructure is a quantum dot.

Nanostructure Film Layer

In some embodiments, the present invention provides a nanostructure film layer comprising:
(a) at least one population of nanostructures, wherein between about 20 and about 100 mole percent of ligands in at least one population of nanostructures comprises a thiolated ligand bound to the nanostructures; and (b) at least one organic resin, wherein at least one organic resin is a thiol-functionalized resin.

In some embodiments, the nanostructure is a quantum dot.

Nanostructure Molded Article

In some embodiments, the present invention provides a nanostructure molded article comprising:

(a) at least one population of nanostructures, wherein between about 20 and about 100 mole percent of ligands in at least one population of nanostructures comprise a thiolated ligand bound to the nanostructures; and (b) at least one organic resin, wherein at least one organic resin is a thiol-functionalized resin.

In some embodiments, the molded article is a film, a substrate for a display, or a light emitting diode.

In some embodiments, the nanostructure is a quantum dot.

In some embodiments, the present invention provides a nanostructure film comprising:

(a) a first barrier layer;
(b) a second barrier layer; and
(c) a nanostructure layer between the first barrier layer and the second barrier layer, wherein the nanostructure layer comprises at least one population of nanostructures, wherein between about 20 and about 100 mole percent of ligands in at least one population of nanostructures comprise a thiolated ligand bound to the nanostructures; and at least one organic resin, wherein at least one organic resin is a thiol-functionalized resin.

In some embodiments, the nanostructure is a quantum dot.

Quantum Dots

The quantum dots (or other nanostructures) for use in the present invention can be produced from any suitable material, suitably an inorganic material, and more suitably an inorganic conductive or semiconductive material. Suitable semiconductor materials include any type of semiconductor, including Group II-VI, Group III-V, Group IV-VI, and Group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2CO$, and combinations thereof.

The synthesis of Group II-VI nanostructures has been described in U.S. Pat. Nos. 6,225,198, 6,322,901, 6,207,229, 6,607,829, 6,861,155, 7,060,243, 7,125,605, 7,374,824, 7,566,476, 8,101,234, and 8,158,193 and in U.S. Patent Appl. Publication Nos. 2011/0262752 and 2011/0263062. In some embodiments, the core is a Group II-VI nanocrystal selected from the group consisting of ZnO, ZnSe, ZnS, ZnTe, CdO, CdSe, CdS, CdTe, HgO, HgSe, HgS, and HgTe. In some embodiments, the core is a nanocrystal selected from the group consisting of ZnSe, ZnS, CdSe, and CdS.

Although Group II-VI nanostructures such as CdSe and CdS quantum dots can exhibit desirable luminescence behavior, issues such as the toxicity of cadmium limit the applications for which such nanostructures can be used. Less toxic alternatives with favorable luminescence properties are thus highly desirable. Group III-V nanostructures in general and InP-based nanostructures in particular, offer the best known substitute for cadmium-based materials due to their compatible emission range.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures is limited by the trace metal concentration in the precursor materials. The trace metal (including cadmium) concentration in the precursor materials for the Cd-free nanostructures, can be measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the core is a Group III-V nanostructure. In some embodiments, the core is a Group III-V nanocrystal selected from the group consisting of BN, BP, BAs, BSb, AlN, AlP, AlAs, AlSb, GaN, GaP, GaAs, GaSb, InN, InP, InAs, and InSb. In some embodiments, the core is an InP nanocrystal.

The synthesis of Group III-V nanostructures has been described in U.S. Pat. Nos. 5,505,928, 6,306,736, 6,576,291, 6,788,453, 6,821,337, 7,138,098, 7,557,028, 7,645,397, 8,062,967, and 8,282,412 and in U.S. Patent Appl. Publication No. 2015/0236195. Synthesis of Group III-V nanostructures has also been described in Wells, R. L., et al., "The use of tris(trimethylsilyl)arsine to prepare gallium arsenide and indium arsenide," Chem. Mater. 1:4-6 (1989) and in Guzelian, A. A., et al., "Colloidal chemical synthesis and characterization of InAs nanocrystal quantum dots," Appl. Phys. Lett. 69: 1432-1434 (1996).

Synthesis of InP-based nanostructures has been described, e.g., in Xie, R., et al., "Colloidal InP nanocrystals as efficient emitters covering blue to near-infrared," J. Am. Chem. Soc. 129:15432-15433 (2007); Micic, O. I., et al., "Core-shell quantum dots of lattice-matched $ZnCdSe_2$ shells on InP cores: Experiment and theory," J. Phys. Chem. B 104:12149-12156 (2000); Liu, Z., et al., "Coreduction colloidal synthesis of III-V nanocrystals: The case of InP," Angew. Chem. Int. Ed. Engl. 47:3540-3542 (2008); Li, L. et al., "Economic synthesis of high quality InP nanocrystals using calcium phosphide as the phosphorus precursor," Chem. Mater. 20:2621-2623 (2008); D. Battaglia and X. Peng, "Formation of high quality InP and InAs nanocrystals in a noncoordinating solvent," Nano Letters 2:1027-1030 (2002); Kim, S., et al., "Highly luminescent InP/GaP/ZnS nanocrystals and their application to white light-emitting diodes," J. Am. Chem. Soc. 134:3804-3809 (2012); Nann, T., et al., "Water splitting by visible light: A nanophotocathode for hydrogen production," Angew. Chem. Int. Ed. 49:1574-1577 (2010); Borchert, H., et al., "Investigation of ZnS passivated InP nanocrystals by XPS," Nano Letters 2:151-154 (2002); L. Li and P. Reiss, "One-pot synthesis of highly luminescent InP/ZnS nanocrystals without precursor injection," J. Am. Chem. Soc. 130:11588-11589 (2008); Hussain, S., et al. "One-pot fabrication of high-quality InP/ZnS (core/shell) quantum dots and their application to cellular imaging," Chemphyschem. 10:1466-1470 (2009); Xu, S., et al., "Rapid synthesis of high-quality InP nanocrystals," J. Am. Chem. Soc. 128:1054-1055 (2006); Micic, O. I., et al., "Size-dependent spectroscopy of InP quantum dots," J. Phys. Chem. B 101:4904-4912 (1997); Haubold, S., et al., "Strongly luminescent InP/ZnS core-shell nanoparticles," Chemphyschem. 5:331-334 (2001); CrosGagneux, A., et al., "Surface chemistry of InP quantum dots: A comprehensive study," *J. Am. Chem. Soc.* 132:18147-18157 (2010); Micic, O. I., et al., "Synthesis and characterization of InP, GaP, and GaInP$_2$ quantum dots," *J. Phys. Chem.* 99:7754-7759 (1995); Guzelian, A. A., et al., "Synthesis of size-selected, surface-passivated InP nanocrystals," *J. Phys. Chem.* 100:7212-7219 (1996); Lucey, D. W., et al., "Monodispersed InP quantum dots prepared by colloidal chemistry in a non-coordinating solvent," *Chem. Mater.* 17:3754-3762 (2005); Lim, J., et al., "InP@ZnSeS, core@composition gradient shell quantum dots with enhanced stability," *Chem. Mater.* 23:4459-4463 (2011); and Zan, F., et al., "Experimental studies on blinking behavior of single InP/ZnS quantum dots: Effects of synthetic conditions and UV irradiation," *J. Phys. Chem. C* 116:394-3950 (2012).

In some embodiments, the core is doped. In some embodiments, the dopant of the nanocrystal core comprises a metal, including one or more transition metals. In some embodiments, the dopant is a transition metal selected from the group consisting of Ti, Zr, Hf, V, Nb, Ta, Cr, Mo, W, Mn, Tc, Re, Fe, Ru, Os, Co, Rh, Ir, Ni, Pd, Pt, Cu, Ag, Au, and combinations thereof. In some embodiments, the dopant comprises a non-metal. In some embodiments, the dopant is ZnS, ZnSe, ZnTe, CdSe, CdS, CdTe, HgS, HgSe, HgTe, CuInS$_2$, CuInSe$_2$, AlN, AlP, AlAs, GaN, GaP, or GaAs.

Inorganic shell coatings on nanostructures are a universal approach to tailoring their electronic structure. Additionally, deposition of an inorganic shell can produce more robust particles by passivation of surface defects. Ziegler, J., et al., *Adv. Mater.* 20:4068-4073 (2008). For example, shells of wider band gap semiconductor materials such as ZnS can be deposited on a core with a narrower band gap—such as CdSe or InP—to afford structures in which excitons are confined within the core. This approach increases the probability of radiative recombination and makes it possible to synthesize very efficient quantum dots with quantum yields close to unity and thin shell coatings.

In some embodiments, the nanostructures include a core and at least one shell. In some embodiments, the nanostructures include a core and at least two shells. The shell can, e.g., increase the quantum yield and/or stability of the nanostructures. In some embodiments, the core and the shell comprise different materials. In some embodiments, the nanostructure comprises shells of different shell material.

Exemplary materials for preparing shells include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, Si$_3$N$_4$, Ge$_3$N$_4$, Al$_2$O$_3$, Al$_2$CO, and combinations thereof.

In some embodiments, the shell is a mixture of at least two of a zinc source, a selenium source, a sulfur source, a tellurium source, and a cadmium source. In some embodiments, the shell is a mixture of two of a zinc source, a selenium source, a sulfur source, a tellurium source, and a cadmium source. In some embodiments, the shell is a mixture of three of a zinc source, a selenium source, a sulfur source, a tellurium source, and a cadmium source. In some embodiments, the shell is a mixture of: zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium and zinc; cadmium, zinc, and sulfur; cadmium, zinc, and selenium; or cadmium, zinc, sulfur, and selenium. In some embodiments, the shell is a mixture of zinc and selenium. In some embodiments, the shell is a mixture of zinc and sulfur.

Exemplary core/shell luminescent nanostructures include, but are not limited to (represented as core/shell) CdSe/ZnS, InP/ZnS, PbSe/PbS, CdSe/CdS, CdTe/CdS, and CdTe/ZnS. The synthesis of core/shell nanostructures is disclosed in U.S. Pat. No. 9,169,435.

In some embodiments, the nanostructures include a core and at least two shells. In some embodiments, one shell is a mixture of zinc and selenium and one shell is a mixture of zinc and sulfur. In some embodiments, the core/shell/shell nanostructure is InP/ZnSe/ZnS.

The luminescent nanocrystals can be made from a material impervious to oxygen, thereby simplifying oxygen barrier requirements and photostabilization of the quantum dots in the quantum dot film layer. In exemplary embodiments, the luminescent nanocrystals are coated with one or more organic polymeric ligand material and dispersed in an organic polymeric matrix comprising one or more matrix materials. The luminescent nanocrystals can be further coated with one or more inorganic layers comprising one or more material such as a silicon oxide, an aluminum oxide, or a titanium oxide (e.g., SiO$_2$, Si$_2$O$_3$, TiO$_2$, or Al$_2$O$_3$), to hermetically seal the quantum dots.

First Ligands

In some embodiments, the nanostructures comprise ligands bound to their surface. In some embodiments, the nanostructures include a coating layer comprising ligands to protect the nanostructures from external moisture and oxidation, to control aggregation, and to allow for dispersion of the nanostructures in the matrix material. Suitable first ligands include those disclosed in U.S. Pat. Nos. 6,949,206; 7,267,875; 7,374,807; 7,572,393; 7,645,397; and 8,563,133 and in U.S. Patent Appl. Publication Nos. 2008/0237540; 2008/0281010; and 2010/0110728.

In some embodiments, the nanostructure comprises a multi-part ligand structure, such as the three-part ligand structure disclosed in U.S. Patent Appl. Publication No. 2008/237540, in which the head-group, tail-group, and middle/body group are independently fabricated and optimized for their particular function, and then combined into an ideally functioning complete surface ligand.

In some embodiments, the first ligands comprise one or more organic polymeric ligands. Suitable ligands provide: efficient and strong bonding quantum dot encapsulation with low oxygen permeability; precipitate or segregate into domain in the matrix material to form a discontinuous dual-phase or multi-phase matrix; disperse favorably throughout the matrix material; and are commercially available materials or can be easily formulated from commercially available materials.

In some embodiments, the first ligand is a carboxy, a thiol, a phosphine, or a phosphine oxide.

In some embodiments, the first ligand is carboxy. As used herein, "carboxy" refers to a group that contains a carbon-oxygen double bond such as —COOH, —COOR$^A$, OC(O)H, —OC(O)R$^A$, wherein R$^A$ is alkyl, alkenyl, alkynyl, heteroalkyl, cycloalkyl, heterocycloalkyl, aryl, or heteroaryl, each of which can be optionally substituted. In some embodiments, the carboxy is a carboxylic acid, a dicarboxylic acid, a polycarboxylic acid, or a carboxylate. In some embodiments, the first ligand is a carboxylic acid. In some embodiments, the first ligand is a carboxylic acid and is a caprylic acid, capric acid, lauric acid, myristic acid, or palmitic acid. In some embodiments, the first ligand is a carboxylate. In some embodiments, the first ligand is a carboxylate and is a carboxyalkyl.

In some embodiments, the first ligand is a phosphine. In some embodiments, the first ligand is a phosphine and is trihexylphosphine, triocylphosphine (TOP), or tridecylphosphine.

In some embodiments, the first ligand is a phosphine oxide. In some embodiments, the first ligand is a phosphine oxide and is trihexylphosphine oxide, trioctylphosphine oxide (TOPO), or tridecylphosphine oxide.

Thiolated Ligands

Ligands employed in the stabilization of nanostructures generally belong to either the group of neutral L-type ligands, which bind to stoichiometric cation/anion pairs on the crystal surface and X-type ligands, which selectively bind to the cationic component. L-type ligands donate their lone pair to a surface metal atom, thus establishing a dative (coordinate covalent) bond. Examples of L-type ligands are amines, thiols, phosphines, and phosphine oxides. X-type ligands are typically monovalent atoms that bind positively charged sites at the quantum dot surface. Examples of X-type ligands are carboxylates, phosphonates, and thiolates.

In some embodiments, sulfur containing moieties can bind to II-VI nanocrystal surfaces as neutral L-type binding ligands in the form of thiols (R—SH) and as electron donating X-type ligands in the form of thiolates (R—S). The X-type binding of thiolates to a II-VI nanocrystal such as ZnS, is stronger than that of carboxylates or phosphonates, both of which can be readily displaced upon exposure to thiols or deprotonated thiolates.

In some embodiments, the thiolated ligand has at least one thiol functional group. In some embodiments, the thiolated ligand has a polyether backbone.

In some embodiments, the thiolated ligand may be in the form of mixtures of thiol terminated poly(alkylene oxide), copolymers of alkylene oxides such as random copolymer or block copolymers, or combinations thereof. In some embodiments, the copolymer is based on a propylene oxide (PO), an ethylene oxide (EO), or a mixed PO/EO. In some embodiments, the copolymer is a mixed PO/EO. In some embodiments, the thiolated ligand comprises a poly(ethylene oxide)/poly(propylene oxide) block copolymer.

In some embodiments, the thiolated ligand is a mixture of PO and EO. In some embodiments, the ratio of ethylene oxide groups to propylene oxide groups is sufficiently high so that the ligand has a high degree of hydrophilicity. In some embodiments, the ratio of ethylene oxide to propylene oxide groups is low enough that the ligand has the desired resiliency. In some embodiments, the ratio of ethylene oxide groups:propylene oxide groups is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5.

In some embodiments, the thiolated ligand has the structure of Formula I:

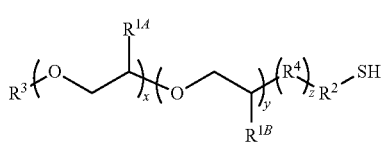

(I)

wherein:
x is 1 to 100;
y is 1 to 100;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiments, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5. In some embodiments, the ratio of x to y is about 19:3.

In some embodiments, z is 1. In some embodiments, z is 0.

In some embodiments, $R^{1A}$ is H. In some embodiments, $R^{1A}$ is $C_{1-20}$ alkyl. In some embodiments, $R^{1A}$ is $C_{1-10}$ alkyl. In some embodiments, $R^{1A}$ is $C_{1-5}$ alkyl. In some embodiments, $R^{1A}$ is $CH_3$.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is $CH_3$.

In some embodiments, $R^2$ is $C_{1-20}$ alkyl. In some embodiments, $R^2$ is $C_{1-10}$ alkyl. In some embodiments, $R^2$ is $C_{1-5}$ alkyl. In some embodiments, $R^2$ is —$CH_2CH_2$—.

In some embodiments, $R^3$ is $C_{1-20}$ alkyl. In some embodiments, $R^3$ is $C_{1-10}$ alkyl. In some embodiments, $R^3$ is $C_{1-5}$ alkyl. In some embodiments, $R^3$ is $CH_3$. In some embodiments, $R^3$ is $C_{3-8}$ cycloalkyl. In some embodiments, $R^3$ is $C_{6-14}$ aryl. In some embodiments, $R^3$ is phenyl, naphthyl, phenanthryl, anthracyl, indenyl, azulenyl, biphenyl, biphenylenyl, and fluorenyl groups.

In some embodiments, $R^4$ is —O—. In some embodiments, $R^4$ is $C_{1-20}$ alkyl. In some embodiments, $R^4$ is $C_{1-10}$ alkyl. In some embodiments, $R^4$ is $C_{1-5}$ alkyl. In some embodiments, $R^4$ is —$CH_2$—. In some embodiments, $R^4$ is amido. In some embodiments, $R^4$ is —NHC(=O)—.

In some embodiments, wherein z is 1, $R^{1A}$ is H, $R^3$ is —$CH_3$, and $R^4$ is —NHC(=O)— in Formula I, the thiolated ligand has the structure of Formula II:

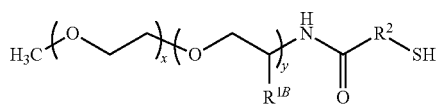

(II)

wherein:
x is 1 to 100;
y is 1 to 100;
$R^{1B}$ is H or $C_{1-20}$ alkyl; and
$R^2$ is $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiments, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, the ratio of x to y is between about 15:1 and about 1:15, about 15:1 and about 1:10, about 15:1 and about 1:5, about 10:1 and 1:15, about 10:1 and 1:10, about 10:1 and 1:5, about 5:1 and 1:15, about 5:1 and 1:10, or about 5:1 and 1:5. In some embodiments, the ratio of x to y is about 19:3.

In some embodiments, $R^{1B}$ is H. In some embodiments, $R^{1B}$ is $C_{1-20}$ alkyl. In some embodiments, $R^{1B}$ is $C_{1-10}$ alkyl. In some embodiments, $R^{1B}$ is $C_{1-5}$ alkyl. In some embodiments, $R^{1B}$ is $CH_3$.

In some embodiments, $R^2$ is $C_{1-20}$ alkyl. In some embodiments, $R^2$ is $C_{1-10}$ alkyl. In some embodiments, $R^2$ is $C_{1-5}$ alkyl. In some embodiments, $R^2$ is —$CH_2CH_2$—.

In some embodiments, the thiolated ligand is prepared from an amine polymer by the reaction shown in SCHEME 1.

SCHEME 1

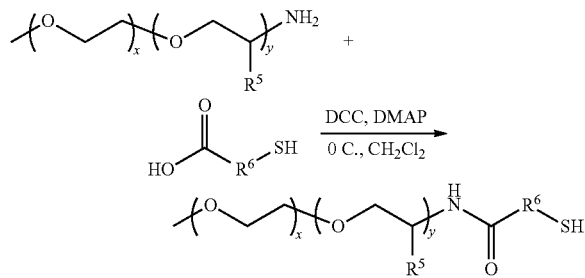

wherein:
x is 1 to 100;
y is 1 to 100;
$R^5$ is H or $C_{1-20}$ alkyl; and
$R^6$ is $C_{1-20}$ alkyl.

In some embodiments, x is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, x is 10 to 50. In some embodiments, x is 10 to 20. In some embodiment, x is 19.

In some embodiments, y is 1 to 100, 1 to 50, 1 to 20, 1 to 10, 1 to 5, 5 to 100, 5 to 50, 5 to 20, 5 to 10, 10 to 100, 10 to 50, 10 to 20, 20 to 100, 20 to 50, or 50 to 100. In some embodiments, y is 1 to 20. In some embodiments, y is 1 to 10. In some embodiments, y is 3.

In some embodiments, $R^5$ is H. In some embodiments, $R^5$ is $C_{1-20}$ alkyl. In some embodiments, $R^5$ is $C_{1-10}$ alkyl. In some embodiments, $R^5$ is $C_{1-5}$ alkyl. In some embodiments, $R^5$ is $CH_3$.

In some embodiments, $R^6$ is $C_{1-20}$ alkyl. In some embodiments, $R^6$ is $C_{1-10}$ alkyl. In some embodiments, $R^6$ is $C_{1-5}$ alkyl. In some embodiments, $R^6$ is —$CH_2CH_2$—.

In some embodiments, the amine polymer is a commercially available amine polymer from Huntsman Petrochemical Corporation. In some embodiments, the amine polymer of SCHEME 1 has x=1, y=9, and $R^3$=$CH_3$ and is JEFFAMINE M-600 (Huntsman Petrochemical Corporation, Texas). JEFFAMINE M-600 has a molecular weight of approximately 600. In some embodiments, the amine polymer of SCHEME 1 has x=19, y=3, and $R^3$=$CH_3$ and is JEFFAMINE M-1000 (Huntsman Petrochemical Corporation, Texas). JEFFAMINE M-1000 has a molecular weight of approximately 1,000. In some embodiments, the amine polymer of SCHEME 1 has x=6, y=29, and $R^3$=$CH_3$ and is JEFFAMINE M-2005 (Huntsman Petrochemical Corporation, Texas). JEFFAMINE M-2005 has a molecular weight of approximately 2,000. In some embodiments, the amine polymer of SCHEME 1 has x=31, y=10, and $R^3$=$CH_3$ and is JEFFAMINE M-2070 (Huntsman Petrochemical Corporation, Texas). JEFFAMINE M-2070 has a molecular weight of approximately 2,000.

Ligand Exchange

In some embodiments, the present invention is directed to a method for exchanging ligands on nanostructures. In some embodiments, a first ligand on a nanostructure dot is exchanged with a thiolated ligand. Thiol groups displace the native hydrophobic ligands of the nanostructure and afford a stable anchoring of the ligand onto the nanocrystal surface. In some embodiments, the nanostructure is a quantum dot.

In some embodiments, the present invention is directed to a method of replacing a first ligand on a nanostructure with a second ligand. In some embodiments, the second ligand is a thiolated ligand. In some embodiments, the nanostructure is a quantum dot.

In some embodiments, the present invention is directed to a method of replacing a first ligand on a nanostructure with a second ligand comprising:
  admixing a reaction mixture comprising a population of nanostructures having a first ligand bound to the nanostructure and a thiolated ligand comprising the second ligand, such that the second ligand displaces the first ligand and becomes bound to the nanostructure.

In some embodiments, the nanostructure is a quantum dot.

In some embodiments, the first ligand is bound covalently to the nanostructure. In some embodiments, the first ligand is bound non-covalently to the nanostructure.

In some embodiments, the second ligand becomes covalently bound to the nanostructure. In some embodiments, the second ligand becomes non-covalently bound to the nanostructure.

In some embodiments, the admixing is performed at a temperature between about 0° C. and about 200° C., about 0° C. and about 150° C., about 0° C. and about 100° C., about 0° C. and about 80° C., about 20° C. and about 200° C., about 20° C. and about 150° C., about 20° C. and about 100° C., about 20° C. and about 80° C., about 50° C. and about 200° C. about 50° C. and about 150° C., about 50° C. and about 100° C., about 50° C. and about 80° C., about 80° C. and about 200° C., about 80° C. and about 150° C., about 80° C. and about 100° C., about 100° C. and about 200° C., about 100° C. and about 150° C., or about 150° C. and about 200° C. In some embodiments, the admixing is performed at a temperature between about 50° C. and about 100° C. In some embodiments, the admixing is performed at a temperature of about 80° C.

In some embodiments, the admixing is performed over a period of about 1 minute and about 6 hours, about 1 minute and about 2 hours, about 1 minute and about 1 hour, about 1 minute and about 40 minutes, about 1 minute and about 30 minutes, about 1 minute and about 20 minutes, about 1 minute and about 10 minutes, about 10 minutes and about 6 hours, about 10 minutes and about 2 hours, about 10 minutes and about 1 hour, about 10 minutes and about 40 minutes, about 10 minutes and about 30 minutes, about 10 minutes and about 20 minutes, about 20 minutes and about 6 hours, about 20 minutes and about 2 hours, about 20 minutes and about 1 hour, about 20 minutes and about 40 minutes, about 20 minutes and about 30 minutes, about 30 minutes and about 6 hours, about 30 minutes and about 2 hours, about 30 minutes and about 1 hour, about 30 minutes and about 40 minutes, about 40 minutes and about 6 hours, about 40 minutes and about 2 hours, about 40 minutes and about 1 hour, about 1 hour and about 6 hours, about 1 hour and about 2 hours, or about 2 hours and about 6 hours. In some embodiments, the admixing is performed over a period of about 40 minutes and about 2 hours. In some embodiments, the admixing is performed over a period of about 1 hour.

In some embodiments, the reaction mixture further comprises a solvent. In some embodiments, the solvent is selected from the group consisting of chloroform, acetone, butanone, ethylene glycol monoethyl ether, ethylene glycol monopropyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof. In some embodiments the solvent is toluene.

The ratio of the quantum dots to the thiolated ligand can be determined by measuring the optical density of a stock solution at a desired wavelength. For example, to achieve a ligand ratio of 5.0 mg/mL/$OD_{460}$, 4.0 mL of a stock solution of quantum dots with an optical density of 10 (measured at a wavelength of 460 nm in a 1 cm path length cuvette) can be combined with 200 mg of a thiol-functionalized ligand. And, to achieve a ligand ratio of 2.5 mg/mL/$OD_{460}$, 4.0 mL of a stock solution of quantum dots with an optical density of 10 (measured at a wavelength of 460 nm in a 1 cm path length cuvette) can be combined with 100 mg of a thiolated ligand.

In some embodiments, the ratio of quantum dots to the thiolated ligand measured by optical density (at a wavelength between about 450 nm and about 600 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL. In some embodiments, the ratio of quantum dots to the thiolated ligand measured by optical density (at a wavelength of about 460 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

In some embodiments, the ratio of quantum dots to the thiolated ligand measured by optical density (at a wavelength between about 600 nm and about 750 nm) is between about 0.25 mg/mL and about 10 mg/mL, about 0.25 mg/mL and about 5 mg/mL, about 0.25 mg/mL and about 1 mg/mL, about 0.25 mg/mL and about 0.5 mg/mL, about 0.5 mg/mL and about 10 mg/mL, about 0.5 mg/mL and about 5 mg/mL, about 0.5 mg/mL and about 1 mg/mL, about 1 mg/mL and about 10 mg/mL, about 1 mg/mL and about 5 mg/mL, or about 5 mg/mL and about 10 mg/mL.

The percentage of first ligands displaced by the thiolated ligand can be measured by $^1$H NMR. In some embodiments, the mole percentage of first ligands displaced by the thiolated ligand is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

The percentage of nanostructures in a population of nanostructures that comprise a thiolated ligand can be measured by $^1$H NMR. In some embodiments, the mole percentage of ligands in a population of nanostructures that comprise a thiolated ligand is between about 20% and about 100%, about 20% and about 80%, about 20% and about 60%, about 20% and about 40%, about 25% and about 100%, about 25% and about 80%, about 25% and about 60%, about 25% and about 40%, about 30% and about 100%, about 30% and about 80%, about 30% and about 60%, about 30% and about 40%, about 40% and about 100%, about 40% and about 80%, about 40% and about 60%, about 60% and about 100%, about 60% and about 80%, or about 80% and about 100%.

Organic Resin

In some embodiments, at least one organic resin is a thiol-functionalized resin. In some embodiments, at least two organic resins are thiol-functionalized resins. In some embodiments, at least three organic resins are thiol-functionalized resins.

As used herein, the term "thiol-functionalized resin" includes compounds that contain at least one —SH group. In some embodiments, the thiol-functionalized resin contains more than one —SH group and is a polythiol-functionalized resin. The term thiol-functionalized resin includes polythiol-functionalized resins.

In some embodiments, the organic resin is a thermosetting resin or a ultraviolet (UV) curable resin. In some embodiments, the organic resin is cured with a method that facilitates roll-to-roll processing.

Thermosetting resins require curing in which they undergo an irreversible molecular cross-linking process which renders the resin infusible. In some embodiments, the thermosetting resin is an epoxy resin, a phenolic resin, a vinyl resin, a melamine resin, a urea resin, an unsaturated polyester resin, a polyurethane resin, an allyl resin, an acrylic resin, a polyamide resin, a polyamide-imide resin, a phenolamine condensation polymerization resin, a urea melamine condensation polymerization resin, or combinations thereof.

In some embodiments, the thermosetting resin is an epoxy resin. Epoxy resins are easily cured without evolution of volatiles or by-products by a wide range of chemicals. Epoxy resins are also compatible with most substrates and tend to wet surfaces easily. See Boyle, M. A., et al., "Epoxy Resins," Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation, Auburn, Mich.).

In some embodiments, a thermal initiator is used. In some embodiments, the thermal initiator is [2,2'-azobis(2-methyl-propionitrile)] (AIBN) or benzoyl peroxide.

UV curable resins are polymers that cure and quickly harden when exposed to a specific light wavelength. In some embodiments, the UV curable resin is a resin having as a functional group a radical-polymerization group such as a (meth)acrylyloxy group, a vinyloxy group, a styryl group, or a vinyl group; or a cation-polymerizable group such as an epoxy group, a thioepoxy group, a vinyloxy group, or an oxetanyl group. In some embodiments, the UV curable resin is a polyester resin, a polyether resin, a (meth)acrylic resin, an epoxy resin, a urethane resin, an alkyd resin, a spiroacetal resin, a polybutadiene resin, or a polythiolpolyene resin.

In some embodiments, the UV curable resin is selected from the group consisting of isobornyl acrylate (IBOA), urethane acrylate, allyloxylated cyclohexyl diacrylate, bis (acryloxy ethyl)hydroxyl isocyanurate, bis(acryloxy neopentylglycol)adipate, bisphenol A diacrylate, bisphenol A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythritol hexaacrylate, dipentaerythritol monohydroxy pentaacrylate, di(trimethylolpropane) tetraacrylate, ethyleneglycol dimethacrylate, glycerol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl)isocyanurate, phosphoric acid triacrylate, phosphoric acid diacrylate, acrylic acid propargyl ester, vinyl terminated polydimethylsiloxane, vinyl terminated diphenylsiloxane-dimethylsiloxane copolymer, vinyl terminated polyphenylmethylsiloxane, vinyl terminated trifluoromethylsiloxane-dimethylsiloxane copolymer, vinyl terminated diethyl siloxane-dimethyl siloxane copolymer, vinylmethylsiloxane, monomethacryloyloxypropyl terminated polydimethyl siloxane, monovinyl terminated polydimethyl siloxane, monoallyl-mono trimethylsiloxy terminated polyethylene oxide, and combinations thereof.

In some embodiments, the UV curable resin is a thiol-functionalized resin or polythiol-functionalized resin that can be cross-linked with an isocyanate, an epoxy, or an unsaturated compound under UV curing conditions.

In some embodiments, the polythiol-functionalized resin is pentaerythritol tetrakis(3-mercaptopropionate) (PTMP); trimethylol-propane tri(3-mercaptopropionate) (TMPMP); glycol di(3-mercapto-propionate) (GDMP); tris[25-(3-mercaptopropionyloxy)ethyl]isocyanurate (TEMPIC); di-pentaerythritol hexa(3-mercaptopropionate) (Di-PETMP); ethoxylated trimethylolpropane tri(3-mercaptopropionate) (ETTMP 1300 and ETTMP 700); polycaprolactone tetra(3-mercaptopropionate) (PCL4MP 1350); pentaerythritol tetramercaptoacetate (PETMA); trimethylol-propane trimercaptoacetate (TMPMA); or glycol dimercaptoacetate (GDMA). These compounds are sold under the trade name THIOCURE® by Bruno Bock, Marschacht, Germany.

In some embodiments, the UV curable resin is a polythiol-functionalized resin. In some embodiments, the UV curable resin is a polythiol-functionalized compound selected from the group consisting of ethylene glycol bis (thioglycolate), ethylene glycol bis(3-mercaptopropionate), trimethylol propane tris (thioglycolate), trimethylol propane tris (3-mercaptopropionate), pentaerythritol tetrakis (thioglycolate), pentaerythritol tetrakis(3-mercaptopropionate) (PTMP), and combinations thereof. In some embodiments, the polythiol-functionalized resin is PTMP.

In some embodiments, the UV curable resin is a thiol-ene formulation comprising a polythiol-functionalized resin and 1,3,5-triallyl-1,3,5-triazine-2,4,6-(1H,3H,5H)-trione (TTT). In some embodiments, the UV curable resin is a thiol-ene formulation comprising PTMP and TTT.

In some embodiments, the UV curable resin further comprises a photoinitiator. A photoinitiator initiates the curing reaction of the photosensitive material during exposure to light. In some embodiments, the photoinitiator is acetophenone-based, benzoin-based, or thioxathenone-based.

In some embodiments, the photoinitiator is MINS-311RM (Minuta Technology Co., Ltd, Korea).

In some embodiments, the photoinitiator is IRGACURE 127, IRGACURE 184, IRGACURE 184D, IRGACURE 2022, IRGACURE 2100, IRGACURE 250, IRGACURE 270, IRGACURE 2959, IRGACURE 369, IRGACURE 369 EG, IRGACURE 379, IRGACURE 500, IRGACURE 651, IRGACURE 754, IRGACURE 784, IRGACURE 819, IRGACURE 819Dw, IRGACURE 907, IRGACURE 907 FF, IRGACURE Oxe01, IRGACURE TPO-L, IRGACURE 1173, IRGACURE 1173D, IRGACURE 4265, IRGACURE BP, or IRGACURE MBF (BASF Corporation, Wyandotte, Mich.). In some embodiments, the photoinitiator is TPO (2,4,6-trimethylbenzoyl-diphenyl-phosphine oxide) or MBF (methyl benzoylformate).

In some embodiments, the weight percentage of the organic resin in the nanostructure composition is between about 5% and about 50%, about 5% and about 40%, about 5% and about 30%, about 5% and about 20%, about 5% and about 10%, about 10% and about 50%, about 10% and about 40%, about 10% and about 30%, about 10% and about 20%, about 20% and about 50%, about 20% and about 40%, about 20% and about 30%, about 30% and about 50%, about 30% and about 40%, or about 40% and about 50%.

In some embodiments, the weight percentage of the organic resin in the nanostructure molded article is between about 0.01% and about 50%, about 0.01% and about 25%, about 0.01% and about 20%, about 0.01% and about 15%, about 0.01% and about 10%, about 0.01% and about 5%, about 0.01% and about 2%, about 0.01% and about 1%, about 1% and about 50%, about 1% and about 25%, about 1% and about 20%, about 1% and about 15%, about 1% and about 10%, about 1% and about 5%, about 1% and about 2%, about 2% and about 50%, about 2% and about 25%, about 2% and about 20%, about 2% and about 15%, about 2% and about 10%, about 2% and about 5%, 5% and about 50%, about 5% and about 25%, about 5% and about 20%, about 5% and about 15%, about 5% and about 10%, about 10% and about 50%, about 10% and about 25%, about 10% and about 20%, about 10% and about 15%, about 15% and about 50%, about 15% and about 25%, about 15% and about 20%, about 20% and about 50%, about 20% and about 25%, or about 25% and about 50%.

In some embodiments, if more than one organic resin is used, the organic resins are added together and mixed. In some embodiments, a first organic resin and a second organic resin are added together and mixed.

In some embodiments, a first organic resin is mixed with a second organic resin at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, a first organic resin is mixed with a second organic resin for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

Making the Nanostructure Compositions

The present invention provides a method of making a nanostructure composition comprising admixing at least one population of nanostructures and at least one organic resin. In some embodiments, between about 20 and about 100 mole percent of ligands in the population of nanostructures comprise a thiolated ligand. In some embodiments, at least one organic resin is a thiol-functionalized resin.

The present invention provides a method of preparing a nanostructure composition, the method comprising:
  (a) providing a composition comprising at least one population of nanostructures, wherein between about 20 and about 100 mole percent of ligands in the population of nanostructures comprise a thiolated ligand bound to the nanostructures; and
  (b) admixing at least one organic resin with the composition of (a), wherein at least one organic resin is a thiol-functionalized resin.

In some embodiments, the population of nanostructures emits red, green, or blue light. In some embodiments, the respective portions of red, green, and blue light can be controlled to achieve a desired white point for the white light emitted by a display device incorporating a nanostructure film.

In some embodiments, the nanostructure composition comprises at least one population of nanostructure materials. In some embodiments, the nanostructure composition comprises a population of between 1 and 5, 1 and 4, 1 and 3, 1 and 2, 2 and 5, 2 and 4, 2 and 3, 3 and 5, 3 and 4, or 4 and 5 nanostructure materials. Any suitable ratio of the populations of quantum dots can be combined to create the desired nanostructure composition characteristics. In some embodiments, the nanostructure is a quantum dot.

In some embodiments, the nanostructure composition comprises at least one organic resin, wherein at least one organic resin is a thiol-functionalized resin. In some embodiments, the nanostructure composition comprises between 1 and 5, 1 and 4, 1 and 3, 1 and 2, 2 and 5, 2 and 4, 2 and 3, 3 and 5, 3 and 4, or 4 and 5 organic resins. In some embodiments, the nanostructure composition comprises between 1 and 3, 1 and 2, or 2 and 3 thiol-functionalized resins. In some embodiments, the nanostructure composition comprises 1 organic resin and 1 thiol-functionalized resin. In some embodiments, the thiol-functionalized resin is the only organic resin in the nanostructure composition. In some embodiments, the nanostructure is a quantum dot.

In some embodiments, the weight percentage of the population of nanostructures in the nanostructure composition is between about 0.001% and about 2%, about 0.001% and about 1%, about 0.001% and about 0.5%, about 0.001% and about 0.1%, about 0.001% and 0.01%, about 0.01% and about 2%, about 0.01% and about 1%, about 0.01% and about 0.5%, about 0.01% and about 0.1%, about 0.1% and about 2%, about 0.1% and about 1%, about 0.1% and about 0.5%, about 0.5% and about 2%, about 0.5% and about 1%, or about 1% and about 2%. In some embodiments, the nanostructure is a quantum dot.

In some embodiments, the weight percentage of the organic resin in the nanostructure composition is between about 5% and about 50%, about 5% and about 40%, about 5% and about 30%, about 5% and about 20%, about 5% and about 10%, about 10% and about 50%, about 10% and about 40%, about 10% and about 30%, about 10% and about 20%, about 20% and about 50%, about 20% and about 40%, about 20% and about 30%, about 30% and about 50%, about 30% and about 40%, or about 40% and about 50%.

In some embodiments, the at least one organic resin is admixed with the at least one population of nanostructures at an agitation rate of between about 100 rpm and about 10,000 rpm, about 100 rpm and about 5,000 rpm, about 100 rpm and about 3,000 rpm, about 100 rpm and about 1,000 rpm, about 100 rpm and about 500 rpm, about 500 rpm and about 10,000 rpm, about 500 rpm and about 5,000 rpm, about 500 rpm and about 3,000 rpm, about 500 rpm and about 1,000 rpm, about 1,000 rpm and about 10,000 rpm, about 1,000 rpm and about 5,000 rpm, about 1,000 rpm and about 3,000 rpm, about 3,000 rpm and about 10,000 rpm, about 3,000 rpm and about 10,000 rpm, or about 5,000 rpm and about 10,000 rpm.

In some embodiments, the at least one organic resin is admixed with the at least one population of nanostructures at a temperature between about −5° C. and about 100° C., about −5° C. and about 75° C., about −5° C. and about 50° C., about −5° C. and about 23° C., about 23° C. and about 100° C., about 23° C. and about 75° C., about 23° C. and about 50° C., about 50° C. and about 100° C., about 50° C. and about 75° C., or about 75° C. and about 100° C. In some embodiments, the at least one organic resin is admixed with the at least one population of nanostructures at a temperature between about 23° C. and about 50° C.

In some embodiments, the least one organic resin is admixed with the at least one population of nanostructures for a time of between about 10 minutes and about 24 hours, about 10 minutes and about 20 hours, about 10 minutes and about 15 hours, about 10 minutes and about 10 hours, about 10 minutes and about 5 hours, about 10 minutes and about 1 hour, about 10 minutes and about 30 minutes, about 30 minutes and about 24 hours, about 30 minutes and about 20 hours, about 30 minutes and about 15 hours, about 30 minutes and about 10 hours, about 30 minutes and about 5 hours, about 30 minutes and about 1 hour, about 1 hour and about 24 hours, about 1 hour and about 20 hours, about 1 hour and about 15 hours, about 1 hour and about 10 hours, about 1 hour and about 5 hours, about 5 hours and about 24 hours, about 5 hours and about 20 hours, about 5 hours and about 15 hours, about 5 hours and about 10 hours, about 10 hours and about 24 hours, about 10 hours and about 20 hours, about 10 hours and about 15 hours, about 15 hours and about 24 hours, about 15 hours and about 20 hours, or about 20 hours and about 24 hours.

In some embodiments, the admixing further comprises a solvent. In some embodiments, the solvent is selected from the group consisting of chloroform, acetone, butanone, ethylene glycol monoethyl ether, ethylene glycol monopropyl ether, ethylene glycol monobutyl ether, diethylene glycol diethyl ether, methyl ethyl ketone, methyl isobutyl ketone, monomethyl ether glycol ester, gamma-butyrolactone, methylacetic-3-ethyl ether, butyl carbitol, butyl carbitol acetate, propanediol monomethyl ether, propanediol monomethyl ether acetate, cyclohexane, toluene, xylene, isopropyl alcohol, and combinations thereof.

Increased Stability of the Nanostructure Compositions Comprising Thiolated Ligands The thiolated ligand provides increased stability to the population of nanostructures in a thiol-functionalized resin and allows for storage of the nanostructures for extended periods of time. In some embodiments, the at least one population of nanostructures can be stored with a thiol-functionalized resin at a temperature between about 10° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

The thiolated ligand provides increased stability to the population of nanostructures in a thiol-functionalized resin and allows for storage of the nanostructures for extended periods of time. In some embodiments, the at least one population of nanostructures can be stored with a thiol-functionalized resin at a temperature between about 30° C. and about 90° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

In some embodiments, nanostructures comprising thiolated ligands provide increased resistance to aggregation with the thiol-functionalized resin. This allows an increased concentration of thiol-functionalized resin to be used before the nanostructure composition begins to precipitate. In some embodiments, the at least one population of nanostructures can be stored at a temperature between about 10° C. and about 90° C. with a thiol-functionalized resin without precipitation for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Making a Nanostructure Layer

The nanostructures used in the present invention can be embedded in a polymeric matrix using any suitable method. As used herein, the term "embedded" is used to indicate that the nanostructure population is enclosed or encased with the polymer that makes up the majority of the component of the matrix. In some embodiments, at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

The nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. Preferably, the nanostructure composition is cured after deposition. Suitable curing methods include photo-curing, such as UV curing, and thermal curing. Traditional laminate film processing methods, tape-coating methods, and/or roll-to-roll fabrication methods can be employed in forming the nanostructure films. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

Spin Coating

In some embodiments, the nanostructure composition is deposited onto a substrate using spin coating. In spin coating a small amount of material is typically deposited onto the center of a substrate loaded a machine called the spinner which is secured by a vacuum. A high speed of rotation is applied on the substrate through the spinner which causes centripetal force to spread the material from the center to the edge of the substrate. While most of the material would be spun off, a certain amount remains o the substrate, forming a thin film of material on the surface as the rotation continues. The final thickness of the film is determined by the nature of the deposited material and the substrate in addition to the parameters chosen for the spin process such as spin speed, acceleration, and spin time. For typical films, a spin speed of 1500 to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to the wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," ESC Transactions 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrroldinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the nanostructure compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum dot film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Barrier Layers

In some embodiments, the nanostructure molded article comprises one or more barrier layers disposed on either one or both sides of the nanostructure layer. Suitable barrier layers protect the nanostructure layer and the nanostructure molded article from environmental conditions such as high temperatures, oxygen, and moisture. Suitable barrier materials include non-yellowing, transparent optical materials which are hydrophobic, chemically and mechanically compatible with the nanostructure molded article, exhibit photo- and chemical-stability, and can withstand high temperatures. Preferably, the one or more barrier layers are index-matched to the nanostructure molded article. In preferred embodiments, the matrix material of the nanostructure molded article and the one or more adjacent barrier layers are index-matched to have similar refractive indices, such that most of the light transmitting through the barrier layer toward the nanostructure molded article is transmitted from the barrier layer into the nanostructure layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In preferred embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the nanostructure molded article according to one embodiment. Suitable barrier materials include any suitable barrier materials known in the art. For example, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the nanostructure molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the nanostructure molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructures comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 μm, 100 μm or less, or 50 μm or less.

Each barrier layer of the nanostructure film can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 μm or less, 40 μm or less, 30 μm or less, 25 μm or less, 20 μm or less, or 15 μm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 μm or less, 5 μm or less, 1 μm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Improved Properties of the Nanostructure Films

Films prepared using nanostructure compositions comprising a population of nanostructures comprising thiolated ligands in an organic resin, wherein at least one organic resin is a thiol-functionalized resin provide increased stability at high temperatures. In some embodiments, films prepared using the nanostructure compositions can be stably stored at a temperature between 40° C. and 100° C. for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Films prepared using nanostructure compositions comprising a population of nanostructures comprising thiolated ligands in an organic resin, wherein at least one organic resin is a thiol-functionalized resin a thiol-functionalized resin provide increased stability at high humidity levels. In some embodiments, films prepared using the nanostructure compositions can be stably stored at a relative humidity level between about 60% and about 100% for between about 1 minute and about 3 years, about 1 minute and about 12 months, about 1 minute and about 6 months, about 1 minute and about 3 months, about 1 minute and about 1 month, about 1 minute and about 15 days, about 1 minute and about 1 day, about 1 day and about 3 years, about 1 day and about 12 months, about 1 day and about 6 months, about 1 day and about 3 months, about 1 day and about 1 month, about 1 day and about 15 days, about 15 days and about 3 years, about 15 days and about 12 months, about 15 days and about 6 months, about 15 days and about 3 months, about 15 days and about 1 month, about 1 month and about 3 years, about 1 month and about 12 months, about 1 month and about 6 months, about 1 month and about 3 months, about 3 months and about 3 years, about 3 months and about 12 months, about 3 months and about 6 months, about 6 months and about 3 years, about 6 months and about 12 months, or about 12 months and about 3 years.

Nanostructure Film Features and Embodiments

In some embodiments, the nanostructure films are used to form display devices. As used herein, a display device refers to any system with a lighting display. Such devices include, but are not limited to, devices encompassing a liquid crystal display (LCD), televisions, computers, mobile phones, smart phones, personal digital assistants (PDAs), gaming devices, electronic reading devices, digital cameras, and the like.

In some embodiments, the optical films containing nanostructure compositions are substantially free of cadmium. As used herein, the term "substantially free of cadmium" is intended that the nanostructure compositions contain less than 100 ppm by weight of cadmium. The RoHS compliance definition requires that there must be no more than 0.01% (100 ppm) by weight of cadmium in the raw homogeneous precursor materials. The cadmium concentration can be measured by inductively coupled plasma mass spectroscopy (ICP-MS) analysis, and are on the parts per billion (ppb)

level. In some embodiments, optical films that are "substantially free of cadmium" contain 10 to 90 ppm cadmium. In other embodiment, optical films that are substantially free of cadmium contain less than about 50 ppm, less than about 20 ppm, less than about 10 ppm, or less than about 1 ppm of cadmium.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Preparation of a Carboxylic Acid Polyethylene Oxide/Propylene Oxide Ligand

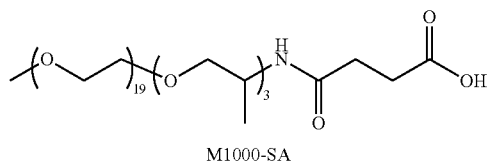

M1000-SA

Carboxylic acid polyethylene oxide/propylene oxide ligand (M1000-SA) was synthesized from an amine-functionalized polyethylene oxide/propylene oxide ligand (JEFFAMINE M-1000 polyetheramine, Huntsman, Tex.) by reaction with succinic anhydride.

Preparation of a Thiolated-Polyethylene Oxide/Propylene Oxide Polymer

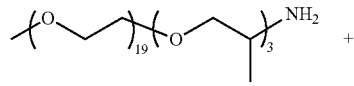

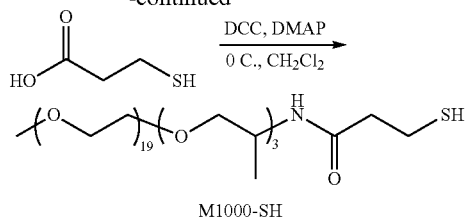

M1000-SH

Thiolated-polyethylene oxide/propylene oxide ligand (M1000-SH) was synthesized from an amine-functionalized polyethylene oxide/propylene oxide ligand (JEFFAMINE M-1000 polyetheramine, Huntsman, Tex.) via a dicyclohexylcarbodiimide (DCC) coupling to 3-mercaptoproprionic acid in the presence of dimethyl aminopyridine (DMAP). The amine-functionalized polyethylene oxide/propylene oxide ligand was dissolved in $CH_2Cl_2$ in the presence of DCC and DMAP. After cooling to 0° C. under an $N_2$ atmosphere, 3-mercaptoproprionic acid was added dropwise. The product was isolated and purified by solvent phase extractions.

Preparation of Thiolated Quantum Dots

Quantum dot samples (InP/ZnSe/ZnS) were washed via multiple cycles of precipitation and resuspension using toluene/methyl acetate to minimize the amount of free (unbound) $Zn(oleate)_2$ and $Zn(laurate)_2$ molecules present in the sample. These quantum dots were then combined at various ratios (where the quantum dot concentration was measured by optical density, OD) with the M1000-SH ligand and heated to 80° C. in toluene under inert atmosphere for one hour.

To achieve a ligand ratio of 5.0 mg/mL/$OD_{460}$, 4.0 mL of a stock solution of quantum dots with an optical density of 10 (measured at 460 nm in a 1 cm path length cuvette) was combined with 200 mg of the M1000-SH ligand.

$^1$H NMR measurements were performed in toluene-$d_8$ to measure the degree of ligand displacement as determined by the ratio of bound and free peaks in the vinyl region (5.0-6.0 ppm). An example of this data is shown in FIG. 1. A summary of the ligand exchange results for the green quatum dots reacted with the M1000-SH ligand are shown in TABLE 1. For comparision purposes, the results for a carboxylate-functionalized polyethylene oxide/propylene oxide ligand (M1000-SA) prepared by a similar exchange reaction are also shown in TABLE 1. The fraction of displaced native ligands scales with the ratio of added polymeric ligand for both the thiol-functionalized and carboxylic acid-functionalized variants.

TABLE 1

Optical Properties and Ligand Displacement for Green Quantum Dots

| Sample | Details | $\lambda_{obs}$ max | $\lambda_{cm}$ max | FWHM | PLQY | Oleate displacement |
|---|---|---|---|---|---|---|
| Starting material | | 509.7 nm | 538.8 nm | 41.0 nm | 87.2% | n/a |
| Starting material after 5 times cleaning | | 509.7 nm | 536.0 nm | 40.9 nm | 72.8% | n/a |
| After ligand exchange | 2.5 mg/OD/mL M1000-SA | 509.7 nm | 535.8 nm | 41.7 nm | 87.8% | 25% |
| After ligand exchange | 5.0 mg/OD/mL M1000-SA | 509.7 nm | 535.7 nm | 41.1 nm | 89.8% | 40% |
| After ligand exchange | 2.5 mg/OD/mL M1000-SH | 509.7 nm | 535.5 nm | 41.0 nm | 88.7% | 20% |

TABLE 1-continued

Optical Properties and Ligand Displacement for Green Quantum Dots

| Sample | Details | $\lambda_{obs}$ max | $\lambda_{cm}$ max | FWHM | PLQY | Oleate displacement |
|---|---|---|---|---|---|---|
| After ligand exchange | 5.0 mg/OD/mL M1000-SH | 509.4 nm | 535.9 nm | 41.0 nm | 88.0% | 30% |

Using the reaction methods described above, red quantum dots were subjected to ligand exchange conditions with a M1000-SA and M1000-SH ligand. A summary of the ligand exchange results for the M1000-SA and M1000-SH ligand are shown in TABLE 2.

TABLE 2

Optical Properties and Ligand Displacement for Red Quantum Dots

| Sample | Details | $\lambda_{obs}$ max | $\lambda_{cm}$ max | FWHM | PLQY | Oleate displacement |
|---|---|---|---|---|---|---|
| Starting material | | 610.5 nm | 634.7 nm | 40.9 nm | 84.4% | 2% |
| After ligand exchange | 0.25 mg/OD/mL M1000-SA | 610.8 nm | 636 nm | 41.4 nm | 69% | 25% |
| After ligand exchange | 0.50 mg/OD/mL M1000-SA | 611.1 nm | 636 nm | 42.4 nm | 74.8% | 40% |
| After ligand exchange | 1.0 mg/OD/mL M1000-SA | 611.2 nm | 635.8 nm | 41.9 nm | 81.8% | 60% |
| After ligand exchange | 2.5 mg/OD/mL M1000-SA | 610.7 nm | 635.9 nm | 42.3 nm | 83.4% | 70% |
| After ligand exchange | 5.0 mg/OD/mL M1000-SA | 611.4 nm | 636.4 nm | 41.7 nm | 73.4% | 95% |
| After ligand exchange | 0.25 mg/OD/mL M1000-SH | 610.5 nm | 635.7 nm | 42.1 nm | 73.8% | 20% |
| After ligand exchange | 0.50 mg/OD/mL M1000-SH | 611.4 nm | 636 nm | 41.9 nm | 76.1% | 25% |
| After ligand exchange | 5.0 mg/OD/mL M1000-SH | 610.8 nm | 639.2 nm | 45.4 nm | 61.5% | 100% |

Figure 2:
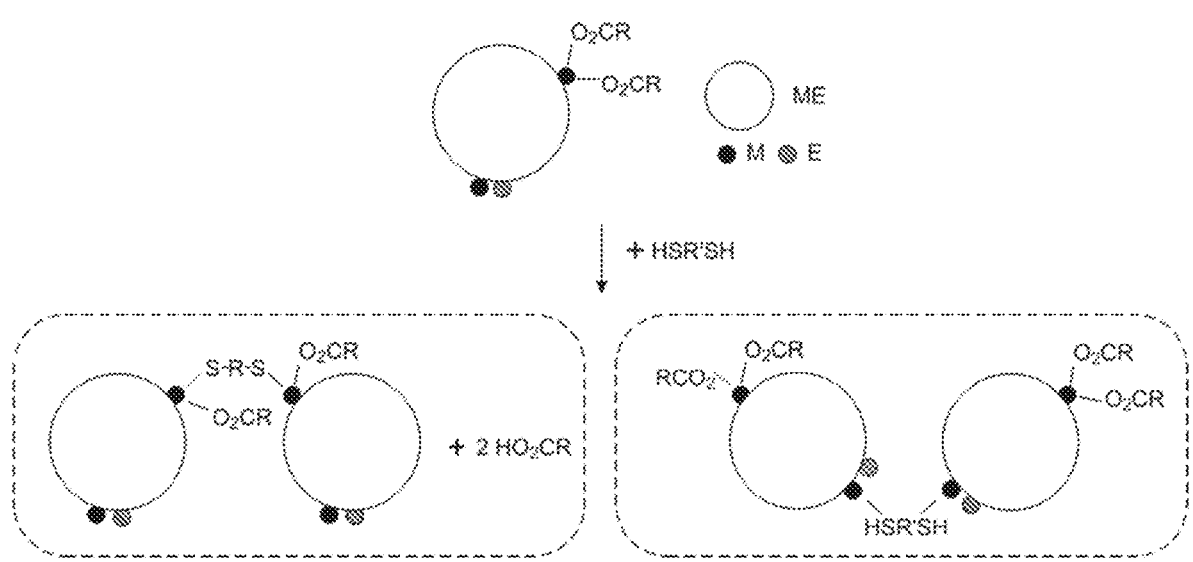
FIG. 2 is a schematic depicting potential pathways to aggregation upon exposure of metal carboxylate terminated quantum dots to multi-functional thiol molecules. Linkage of multiple quantum dots may occur through either a protonation of the carboxylate and thiolate binding or L-type binding to open metal sites.

The increased binding strength of the thiolated ligands was readily apparent upon exposure of ligand exchanged quantum dots to multifunctional thiol molecules common in many resin systems (i.e., tris[2-(3-mercaptopropionyloxy) ethyl]isocyanurate (TEMPIC); or pentaerythritol tetrakis(3-mercaptopropionate) (PTMP)). Multifunctional molecules which bind to more than one quantum dot can cause aggregation and precipitation. Potential mechanisms for the interaction of multifunctional thiol molecules binding to more than one quantum dot are illustrated in FIG. 2.

As a test of their relative stability upon exposure to such resin components, green quantum dots passivated with M1000-SA and M1000-SH ligands were mixed at the same OD with PTMP at concentrations ranging from [PTMP]=$1\times10^{-6}$-$1\times10^{-1}$ M in toluene. Photoluminescence was recorded from each solution within 30 minutes of mixing. Peak position and full width at half maximum (FWHM) values were measured over this concentration range and are shown in FIG. 3A for a sample exchanged with M1000-SA. And, peak position and FWHM values were measured over this concentration range for a sample exchanged with M1000-SH and are shown in FIG. 3B. As shown by FIGS. 3A and 3B, peak position and FWHM values remain relatively stable as the concentration of PTMP increases for green quantum dots passivated with M1000-H, whereas there is a decrease in stability as shown by peak position and FWHM for green quantum dots passivated with M1000-SA as the concentration of PTMP increases.

Figure 4A:
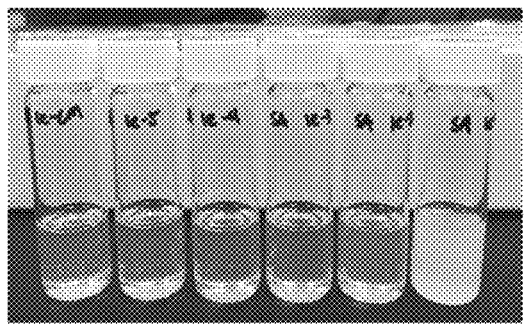
FIG. 4A is a photograph taken 30 minutes after exchange with M1000-SA with increasing PTMP concentration from left to right.
Figure 4B:
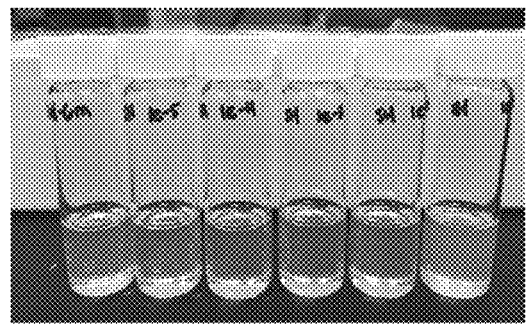
FIG. 4B is a photograph taken 30 minutes after exchange with M1000-SH with increasing PTMP concentration from left to right.
Figure 4C:
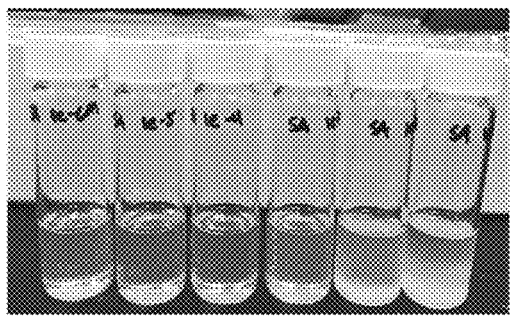
FIG. 4C is a photograph taken 5 hours after exchange with M1000-SA with increasing PTMP concentration from left to right.

Visual evidence of precipitation of green quantum dots passivated with M1000-SA can be observed in the photographs shown in FIGS. 4A and 4C. FIG. 4A shows precipitation after 30 minutes of mixing for a sample exchanged with M1000-SA over a concentration range of PTMP of $1\times10^{-6}$-$1\times10^{-1}$ M in toluene. FIG. 4C shows precipitation after 5 hours after mixing for a sample exchanged with M1000-SA over the same concentration range. FIG. 4C shows additional precipitation for the M1000-SA exchanged samples with increasing PTMP concentration over time.

Figure 4D:
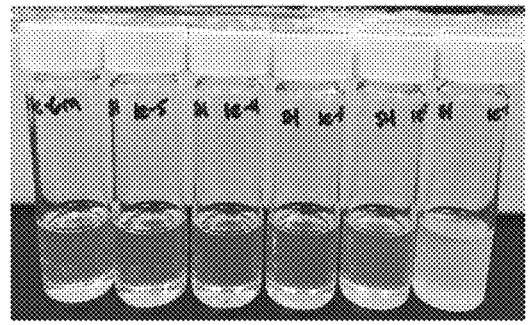
FIG. 4D is a photograph taken 5 hours after exchange with M1000-SH with increasing PTMP concentration from left to right.

Visual evidence of precipitation of green quantum dots passivated with M1000-SH can be observed in the photographs shown in FIGS. 4B and 4D. FIG. 4B shows precipitation after 30 minutes of mixing for a sample exchanged with M1000-SH over a concentration range of PTMP of $1\times10^{-6}$-$1\times10^{-1}$ M in toluene. FIG. 4D shows precipitation after 5 hours after mixing for a sample exchanged with M1000-SH over the same concentration range. FIG. 4D shows additional precipitation for the M1000-SH exchanged samples at the highest concentration ($1\times10^{-1}$ PTMP) over time.

As evidenced by the peak position and from visual evidence of precipitation, the samples passivated with the M1000-SH ligand have greater resistance to aggregation than those exchanged with the M1000-SA ligand—the precipitation of samples passivated with the M1000-SH ligand require an order of magnitude higher PTMP concentration than the precipitation of samples passivated with the M1000-SA ligand. While eventual precipitation was observed for both samples at high PTMP concentrations, nearly 70% of the original carboxylate ligand set is still present under these exchange conditions (5.0 mg/OD/mL M1000-SH). A ligand exchange with the thiolated ligand that displaces more of the native ligands should result in further increases in stability against native ligand displacement by resin monomer species.

Resin formulations (with PTMP as the resin) were made with the after-ligand exchanged samples in isobornyl acrylate (IBOA). Films were cast from these samples and the optical properties of these films, including CIE color-space coordinates (x and y), brightness (L), light conversion efficiency (BFE) were measured, peak position, and FWHM.

TABLE 3

Optical Properties of the Cast Films

| Details | x | y | L | BFE | Green λ (nm) | Green FWHM (nm) | Red λ (nm) | Red FWHM (nm) |
|---|---|---|---|---|---|---|---|---|
| Control POR green | 0.2602 | 0.2336 | 1820 | 49.1% | 538.4 | 39.94 | 627.12 | 47.81 |
| 2.5 mg/OD/mL M1000-SA | 0.2714 | 0.2351 | 1935 | 51.8% | 546.03 | 39.03 | 626.73 | 47.95 |
| 5.0 mg/OD/mL M1000-SA | 0.2685 | 0.2316 | 1922 | 51.8% | 545.45 | 39.32 | 626.69 | 47.99 |
| 2.5 mg/OD/mL M1000-SH | 0.2720 | 0.2397 | 1968 | 52.0% | 546.46 | 38.62 | 627.00 | 48.67 |
| 5.0 mg/OD/mL M1000-SH | 0.2736 | 0.2447 | 2029 | 53.5% | 546.20 | 38.84 | 627.11 | 48.74 |

Figure 5:
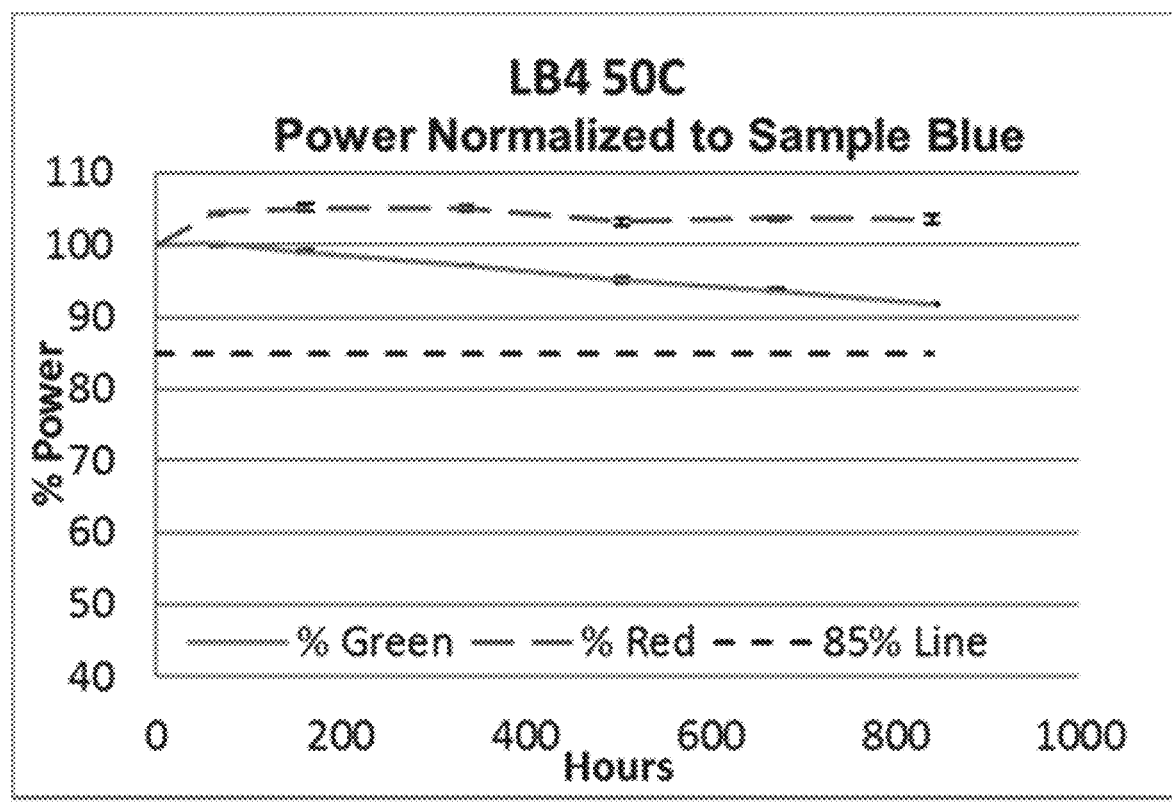
FIG. 5 is a graph showing high-flux reliability data for films made with samples exchanged with 2.5 mg/OD/mL M1000-SA.
Figure 6:
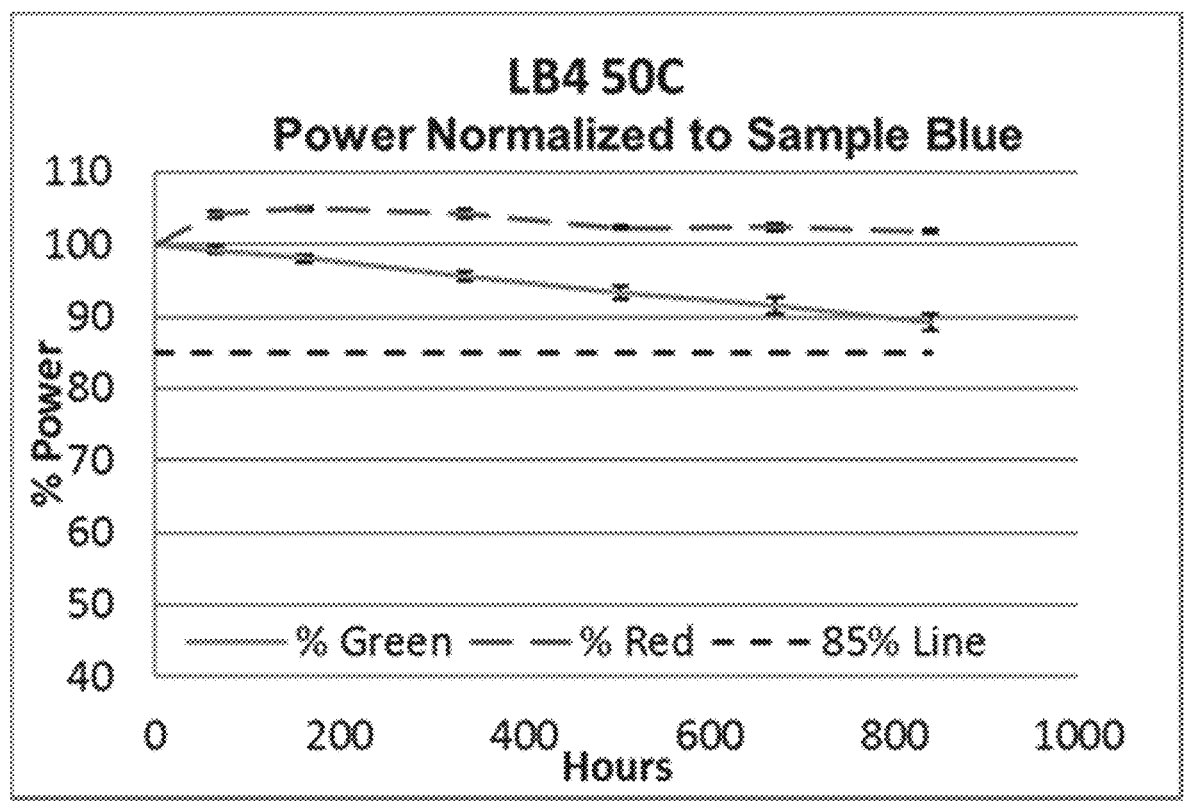
FIG. 6 is a graph showing high-flux reliability data for films made with samples exchanged with 5.0 mg/OD/mL M1000-SA.
Figure 7:
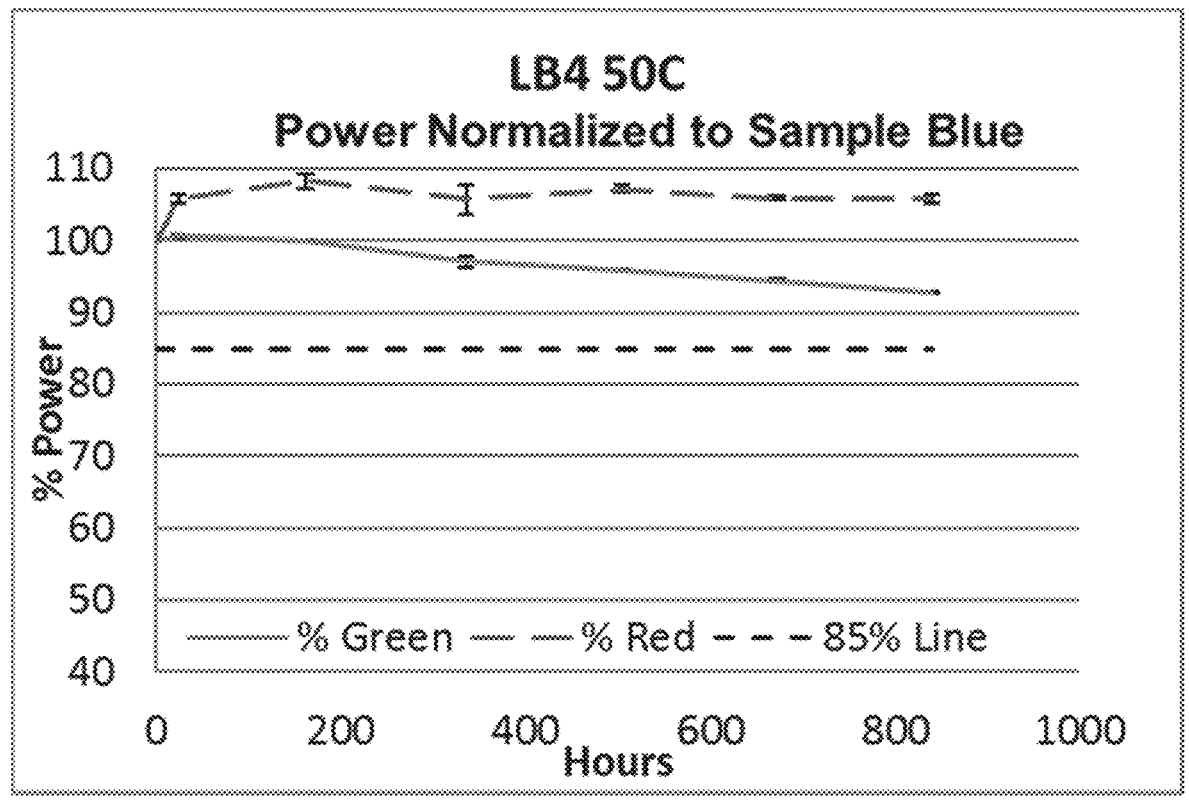
FIG. 7 is a graph showing high-flux reliability data for films made with samples exchanged with 2.5 mg/OD/mL M1000-SH.
Figure 8:
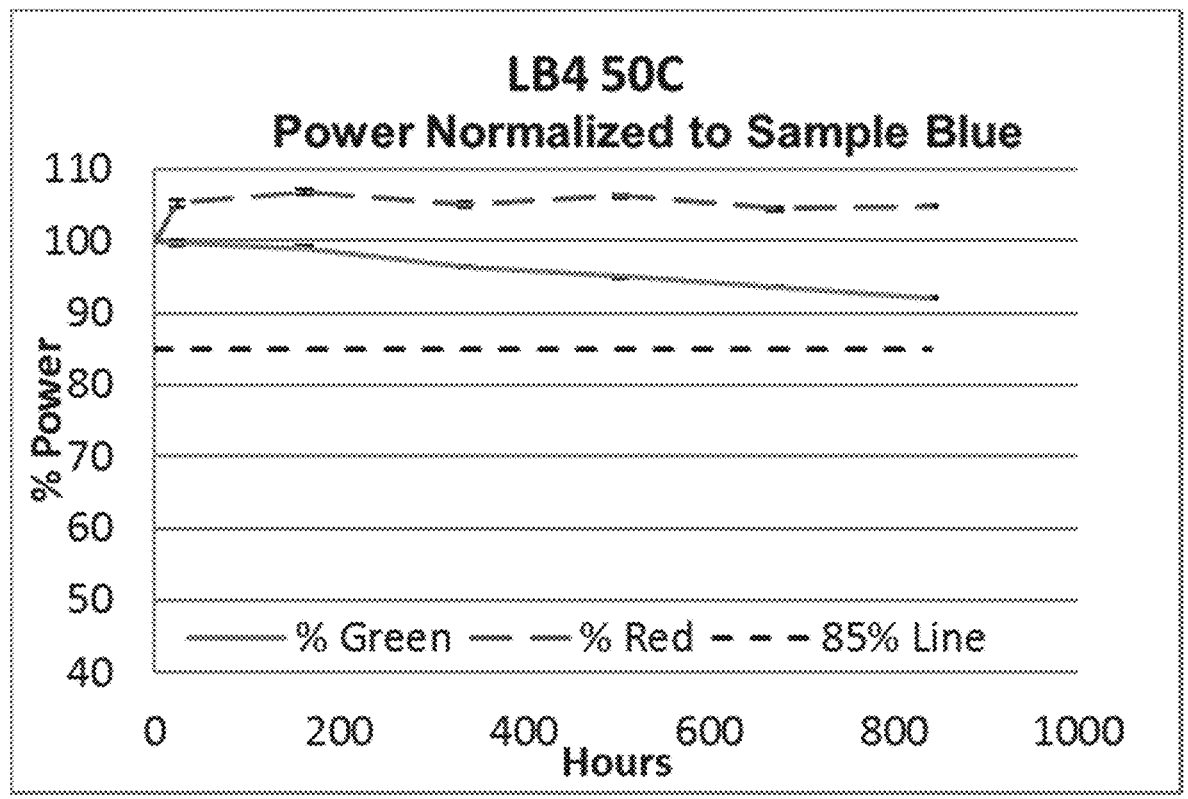
FIG. 8 is a graph showing high-flux reliability data for films made with samples exchanged with 5.0 mg/OD/mL M1000-SH.

These films then underwent a panel of reliability tests. Films made with samples ligand exchanged with the new thiolated-polyethylene oxide/propylene oxide ligand (M1000-SH) showed excellent reliability and low levels of burn-in during high-flux photoexcitation testing, showing a moderate improvement over the reliability data of the current ligand system (M1000-SA). Results for films made with samples exchanged with 2.5 mg/OD/mL and 5.0 mg/OD/mL M1000-SA are shown in FIGS. 5 and 6, respectively. Results for films made with samples exchanged with 2.5 mg/OD/mL and 5.0 mg/OD/mL M1000-SH are shown in FIGS. 7 and 8, respectively. For samples exchanged with M1000-SH, after 840 hours of exposure to high-intensity illumination at a constant temperature of 50° C., the power of the green emission from the film remained within 92.0-92.9% of the original value when normalized to the power of the blue excitation source. In comparison, under the same testing conditions, the normalized emission power for quantum dots exchanged with M1000-SA was at 89.3-91.9% of the starting value after 840 hours of accelerated testing.

Figure 9:
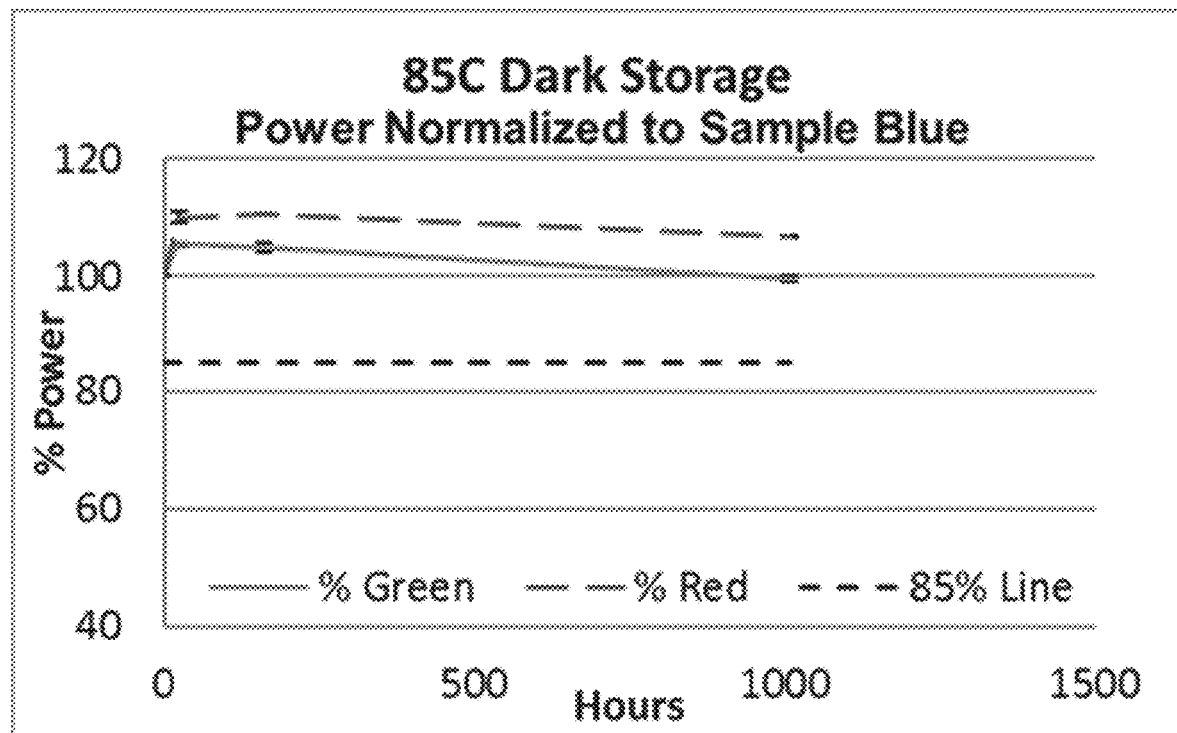
FIG. 9 is a graph showing reliability tests under high temperature dark storage for films made with samples exchanged with 2.5 mg/OD/mL M1000-SH.
Figure 10:
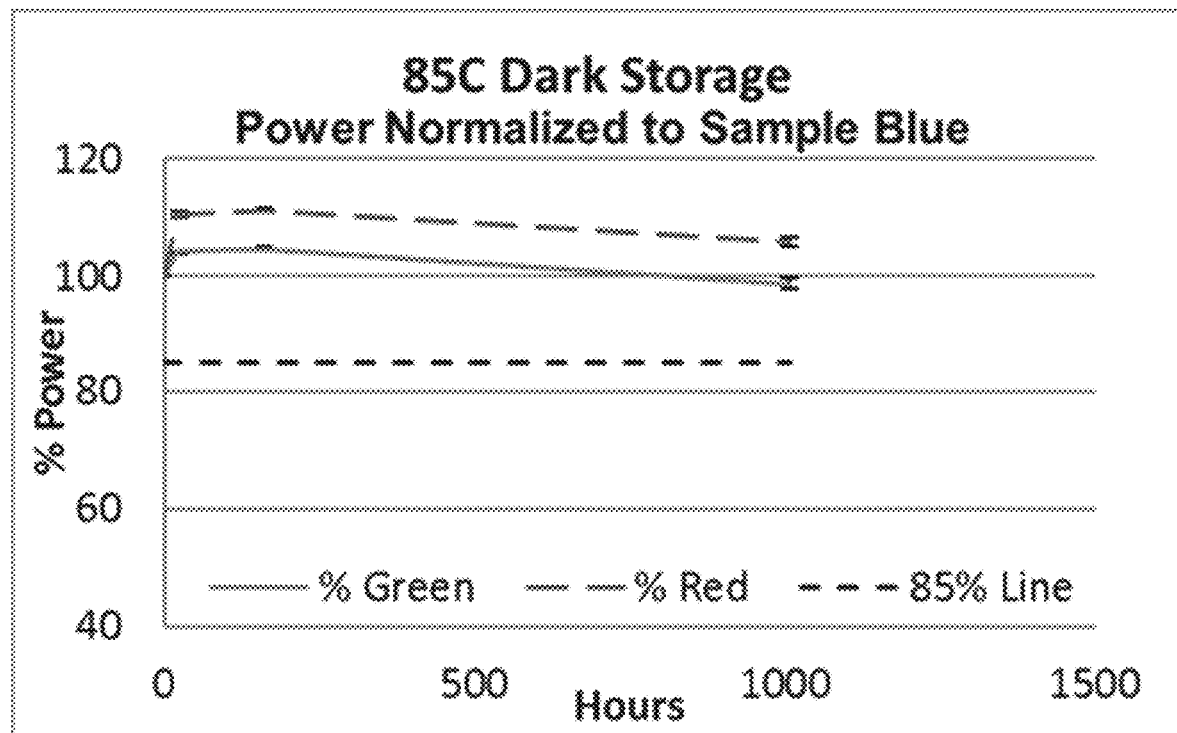
FIG. 10 is a graph showing reliability tests under high temperature dark storage for films made with samples exchanged with 5.0 mg/OD/mL M1000-SH.
Figure 11:
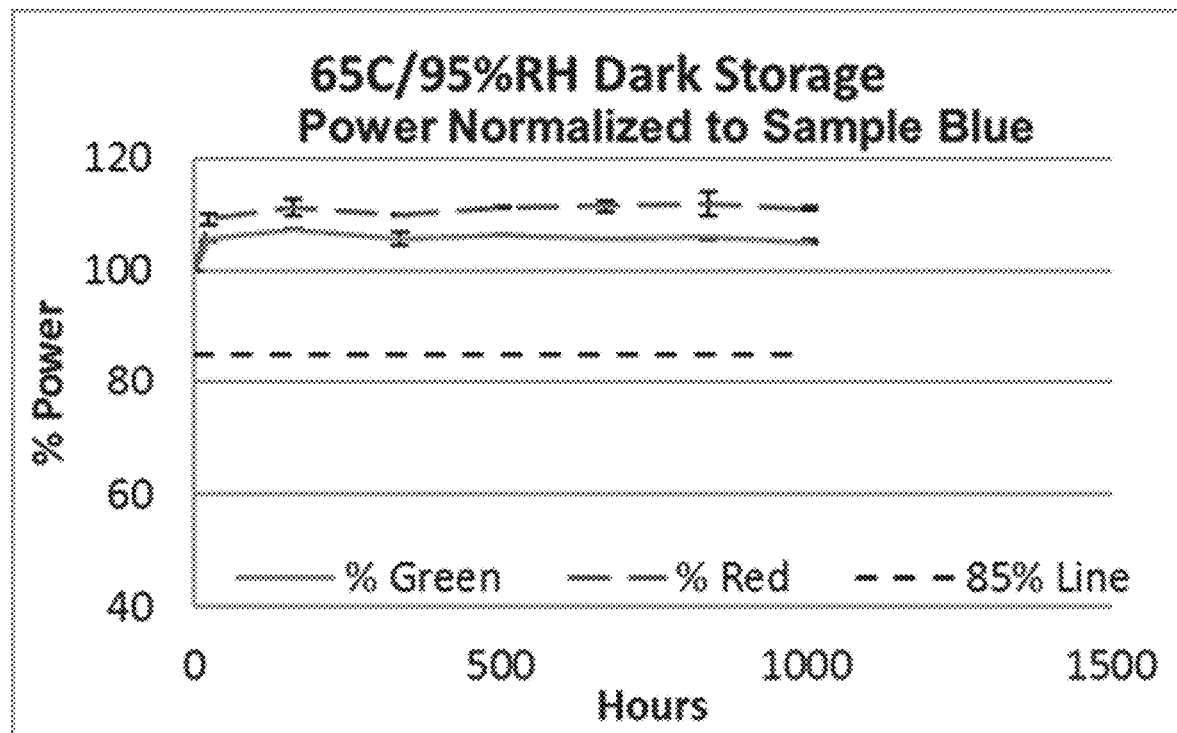
FIG. 11 is a graph showing reliability tests under high humidity storage for films made with samples exchanged with 2.5 mg/OD/mL M1000-SH.
Figure 12:
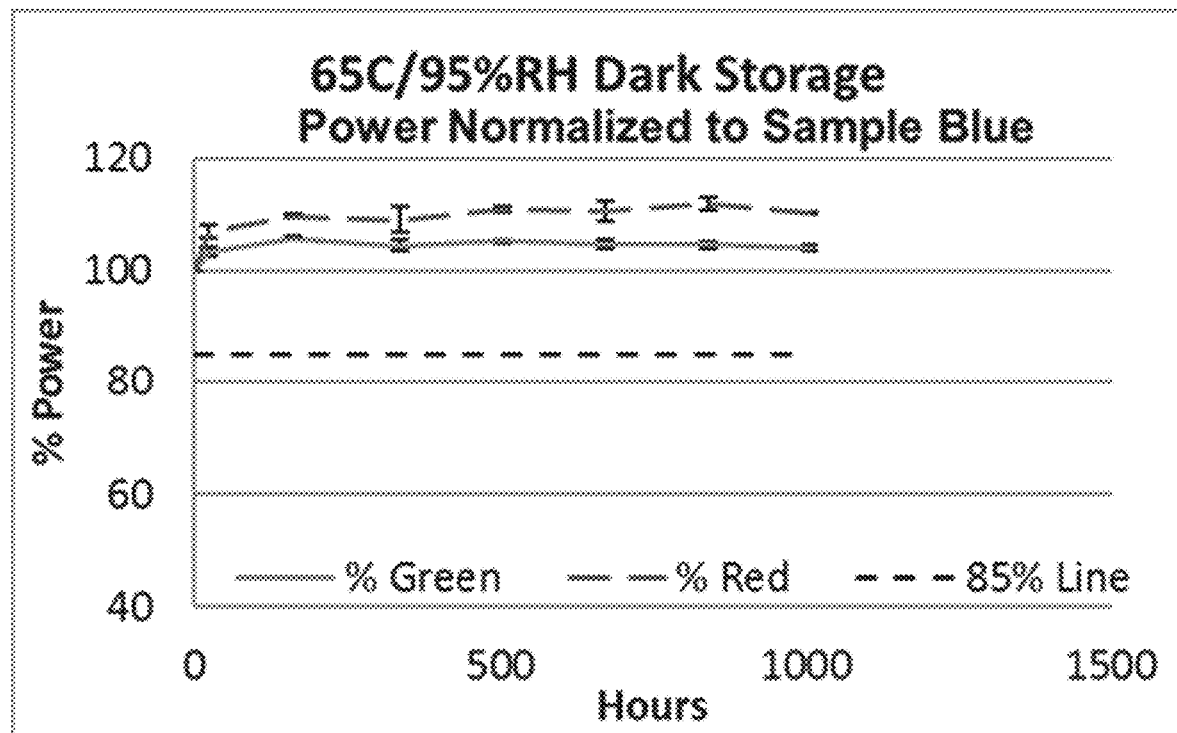
FIG. 12 is a graph showing reliability tests under high humidity storage for films made with samples exchanged with 5.0 mg/OD/mL M1000-SH.

Additional reliability tests for these samples, including sensitivity to heat (85° C. storage under dark conditions) and moisture (65° C. storage under 95% relative humidity), demonstrate excellent reliability for samples exchanged with thiolated ligands. Results for sensitivity to heat for films made with samples exchanged with 2.5 mg/OD/mL and 5.0 mg/OD/mL M1000-SH are shown in FIGS. 9 and 10, respectively. Results for sensitivity to moisture for films made with samples exchanged with 2.5 mg/OD/mL and 5.0 mg/OD/mL M1000-SH are shown in FIGS. 11 and 12, respectively.

While various embodiments have been described above, it should be understood that they have been presented by way of example only, and not limitation. It will be apparent to persons skilled in the relevant art that various changes in form and detail can be made therein without departing from the spirit and scope of the invention. Thus, the breadth and scope should not be limited by any of the above-described exemplary embodiments, but should be defined only in accordance with the following claims and their equivalents.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A composition comprising:
(a) a core/shell nanostructure; and
(b) thiolated ligands bound to the surface of the nanostructure, wherein the thiolated ligands have the formula I:

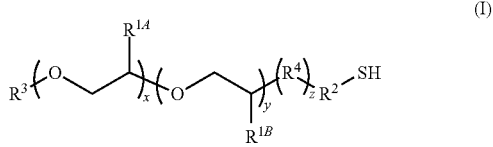

wherein:
x is 10 to 20;
y is 1 to 10;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido.

2. The composition of claim 1, wherein the nanostructure comprises a core selected from the group consisting of InP, InZnP, InGaP, CdSe, CdS, CdSSe, CdZnSe, CdZnS, ZnSe, ZnSSe, InAs, InGaAs, and InAsP.

3. The composition of claim 1, wherein the nanostructure comprises a core of InP.

4. The composition of claim 1, wherein the nanostructure comprises at least one shell and the at least one shell comprises a mixture of at least two materials selected from the group consisting of zinc, sulfur, selenium, tellurium, and cadmium.

5. The composition of claim 1, wherein $R^{1B}$ is $C_{1-5}$ alkyl.

6. The composition of claim 1, wherein $R^2$ is —$CH_2CH_2$—.

7. The composition of claim 1, wherein the nanostructure in (a) comprises an InP core and two shells, and wherein in formula (I) x is 19, y is 3, $R^{1B}$ is $CH_3$, and $R^2$ is —$CH_2CH_2$—.

8. A nanostructure composition, comprising:
(a) at least one population of core/shell nanostructures, wherein between about 20 and about 100 mole percent of ligands in at least one population of nanostructures comprise a thiolated ligand bound to the nanostructure, wherein the thiolated ligand has the formula I:

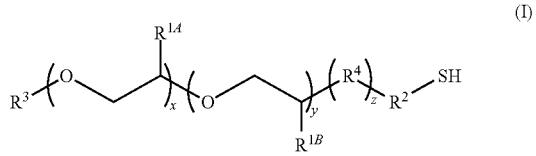

(I)

wherein:
x is 10 to 20,
y is 1 to 10,
z is 0 or 1,
$R^{1A}$ and $R^{1B}$ independently are H or $C_{1-20}$ alkyl,
$R^2$ is $C_{1-20}$ alkyl,
$R^3$ is $C_{1-20}$ alkyl, $C_{3-8}$ cycloalkyl, or $C_{6-14}$ aryl, and
$R^4$ is —O—, $C_{1-20}$ alkyl, or amido; and
(b) at least one organic resin, wherein at least one organic resin is a thiol-functionalized resin.

9. The nanostructure composition of claim 8, comprising between one and five populations of nanostructures.

10. The nanostructure composition of claim 8, wherein the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

11. The nanostructure composition of claim 8, comprising between one and five organic resins.

12. The nanostructure composition of claim 8, wherein at least one organic resin is a mercaptofunctional compound.

13. The nanostructure composition of claim 8, wherein the at least one organic resin is selected from the group consisting of trimethylol-propane tri(3-mercaptopropionate), glycol di(3-mercapto-propionate), tris[25-(3-mercaptopropionyloxy)ethyl]isocyanurate, di-pentaerythritol hexa(3-mercaptopropionate), ethoxylated trimethylolpropane tri(3-mercaptopropionate), polycaprolactone tetra(3-mercaptopropionate), pentaerythritol tetramercaptoacetate, trimethylol-propane trimercaptoacetate, glycol dimercaptoacetate, and pentaerythritol tetrakis(3-mercaptopropionate).

14. The nanostructure composition of claim 8, wherein at least one population of nanostructures in (a) comprises an InP core and at least two shells and the at least one organic resin is pentaerythritol tetrakis(3-mercaptopropionate).

15. The nanostructure composition of claim 8, wherein the composition is stable for between about 1 day and about 3 years when stored at a temperature between about 10° C. and about 90° C.

16. A method of preparing the nanostructure composition of claim 8, the method comprising:
(a) providing a composition comprising at least one population of core/shell nanostructures, wherein between about 20 and about 100 mole percent of ligands in the population of nanostructures comprise the thiolated ligand bound to the nanostructure; and
(b) admixing at least one organic resin with the composition of (a), wherein at least one organic resin is a thiol-functionalized resin.

17. A nanostructure film layer comprising:
(a) at least one population of core/shell nanostructures, wherein between about 20 and about 100 mole percent of ligands in the population of nanostructures comprise a thiolated ligand bound to the nanostructure, wherein the thiolated ligand has the formula I:

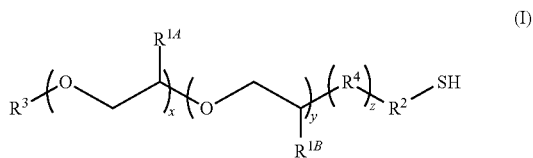

(I)

wherein:
x is 10 to 20;
y is 1 to 10;
z is 0 or 1;
$R^{1A}$ and $R^{1B}$ independently are H or $C_{1-20}$ alkyl;
$R^2$ is $C_{1-20}$ alkyl;
$R^3$ is $C_{1-20}$ alkyl, $C_{3-8}$ cycloalkyl, or $C_{6-14}$ aryl; and
$R^4$ is —O—, $C_{1-20}$ alkyl, or amido; and
(b) at least one organic resin, wherein at least one organic resin is a thiol-functionalized resin.

18. The nanostructure film layer of claim 17, comprising between one and five populations of nanostructures.

19. The nanostructure film layer of claim 17, wherein the at least one population of nanostructures contains a core selected from the group consisting of InP, InZnP, InGaP, CdSe, CdS, CdSSe, CdZnSe, CdZnS, ZnSe, ZnSSe, InAs, InGaAs, and InAsP.

20. The nanostructure film layer of claim 17, comprising between one and five organic resins.

21. The nanostructure film layer of claim 17, wherein the at least one organic resin is selected from the group consisting of trimethylol-propane tri(3-mercaptopropionate), glycol di(3-mercapto-propionate), tris[25-(3-mercaptopropionyloxy)ethyl]isocyanurate, di-pentaerythritol hexa(3-mercaptopropionate), ethoxylated trimethylolpropane tri(3-mercaptopropionate), polycaprolactone tetra(3-mercaptopropionate), pentaerythritol tetramercaptoacetate, trimethylol-propane trimercaptoacetate, glycol dimercaptoacetate, and pentaerythritol tetrakis(3-mercaptopropionate).

* * * * *